US008214447B2

(12) United States Patent
Deslippe et al.

(10) Patent No.: US 8,214,447 B2
(45) Date of Patent: Jul. 3, 2012

(54) MANAGING AN AUDIO NETWORK

(75) Inventors: Mark H. Deslippe, Marlborough, MA (US); Laszlo Drimusz, Framingham, MA (US); Herbert C. Knapp, Holliston, MA (US); Kenneth S. Lyons, Middleborough, MA (US)

(73) Assignee: Bose Corporation, Framingham, MA (US)

( * ) Notice: Subject to any disclaimer, the term of this patent is extended or adjusted under 35 U.S.C. 154(b) by 1300 days.

(21) Appl. No.: 10/863,650

(22) Filed: Jun. 8, 2004

(65) Prior Publication Data
US 2005/0289224 A1 Dec. 29, 2005

(51) Int. Cl.
*G06F 15/16* (2006.01)

(52) U.S. Cl. ........ 709/208; 709/203; 709/217; 370/346; 370/449; 370/471

(58) Field of Classification Search .................. 709/208, 709/217, 203; 370/471, 346, 449
See application file for complete search history.

(56) References Cited

U.S. PATENT DOCUMENTS

| RE28,109 | E | * | 8/1974 | Provenzano, Jr. et al. ...... 701/35 |
|---|---|---|---|---|
| 4,466,063 | A | * | 8/1984 | Segarra et al. ................. 709/226 |
| 4,490,782 | A | * | 12/1984 | Dixon et al. ................... 711/136 |
| 5,025,486 | A | * | 6/1991 | Klughart ........................ 340/3.1 |
| 5,101,267 | A | * | 3/1992 | Morales-Garza ............... 725/65 |
| 5,293,619 | A | * | 3/1994 | Dean ............................. 707/204 |
| 5,297,211 | A | * | 3/1994 | Noro .............................. 381/81 |
| 5,574,979 | A | * | 11/1996 | West ............................. 455/63.1 |
| 5,625,845 | A | * | 4/1997 | Allran et al. ................... 719/322 |
| 5,664,221 | A | * | 9/1997 | Amberg et al. .................... 710/9 |
| 5,737,747 | A | * | 4/1998 | Vishlitzky et al. ............. 711/118 |
| 5,812,529 | A | * | 9/1998 | Czarnik et al. ................. 370/245 |
| 5,884,046 | A | * | 3/1999 | Antonov ........................ 709/238 |
| 5,922,051 | A | * | 7/1999 | Sidey ............................. 709/223 |
| 5,996,022 | A | * | 11/1999 | Krueger et al. ................ 709/247 |
| 5,999,610 | A | * | 12/1999 | Lin et al. ................... 379/207.02 |
| 6,041,393 | A | * | 3/2000 | Hsu ................................ 711/157 |
| 6,061,504 | A | * | 5/2000 | Tzelnic et al. ................. 709/219 |
| 6,085,263 | A | * | 7/2000 | Sharma et al. .................. 710/56 |
| 6,127,941 | A | * | 10/2000 | Van Ryzin ............... 340/825.69 |
| 6,141,681 | A | * | 10/2000 | Kyle .............................. 709/206 |
| 6,255,961 | B1 | * | 7/2001 | Van Ryzin et al. ...... 340/825.25 |
| 6,275,500 | B1 | * | 8/2001 | Callaway et al. ............. 370/449 |
| 6,314,479 | B1 | * | 11/2001 | Frederick et al. ............... 710/63 |
| 6,341,278 | B1 | * | 1/2002 | Yamamoto et al. ............... 707/2 |

(Continued)

FOREIGN PATENT DOCUMENTS

EP 0 414 524 2/1991

(Continued)

OTHER PUBLICATIONS

Miller et al., Starburst MFTP Specification, Apr. 1998.*

(Continued)

*Primary Examiner* — Krista Zele
*Assistant Examiner* — Anthony Fabbri
(74) *Attorney, Agent, or Firm* — Fish & Richardson P.C.

(57) ABSTRACT

A method for an audio system controls a number of audio devices from a master device over a wired network for at least one wired audio device and over a wireless network for at least one wireless device. The method receives a reply in response to a poll message from each of the wired audio devices and aggregate polling information indicative of the state of the wireless devices from one of the wireless devices.

7 Claims, 9 Drawing Sheets

U.S. PATENT DOCUMENTS

| | | | |
|---|---|---|---|
| 6,351,771 B1 * | 2/2002 | Craddock et al. | 709/227 |
| 6,363,434 B1 * | 3/2002 | Eytchison | 719/313 |
| 6,381,599 B1 * | 4/2002 | Jones et al. | 707/5 |
| 6,389,466 B1 * | 5/2002 | Zondag | 709/221 |
| 6,393,430 B1 * | 5/2002 | Van Ryzin | 707/104.1 |
| 6,553,404 B2 * | 4/2003 | Stern | 709/203 |
| 6,633,547 B1 * | 10/2003 | Akatsu et al. | 370/255 |
| 6,785,540 B1 * | 8/2004 | Wichelman | 455/423 |
| 6,785,704 B1 * | 8/2004 | McCanne | 718/105 |
| 6,810,413 B1 * | 10/2004 | Rajakarunanayake et al. | 709/203 |
| 6,810,419 B1 * | 10/2004 | Bogler et al. | 709/224 |
| 6,829,227 B1 * | 12/2004 | Pitt et al. | 370/329 |
| 6,973,052 B2 * | 12/2005 | Wang et al. | 370/278 |
| 6,975,568 B2 * | 12/2005 | Uno | 369/47.16 |
| 7,555,559 B2 * | 6/2009 | Chapweske | 709/232 |
| 7,656,892 B2 * | 2/2010 | Barak et al. | 370/462 |
| 7,938,727 B1 * | 5/2011 | Konkle | 463/42 |
| 8,036,200 B2 * | 10/2011 | Benveniste | 370/345 |
| 2001/0037389 A1 * | 11/2001 | Fujimori et al. | 709/225 |
| 2001/0042109 A1 * | 11/2001 | Bolas et al. | 709/219 |
| 2002/0072816 A1 * | 6/2002 | Shdema et al. | 700/94 |
| 2002/0072817 A1 * | 6/2002 | Champion | 700/94 |
| 2002/0103873 A1 * | 8/2002 | Ramanathan et al. | 709/206 |
| 2002/0108058 A1 * | 8/2002 | Iwamura | 713/201 |
| 2003/0223377 A1 | 12/2003 | Simmons et al. | |
| 2004/0078105 A1 * | 4/2004 | Moon et al. | 700/100 |
| 2004/0095237 A1 * | 5/2004 | Chen et al. | 340/506 |
| 2004/0218620 A1 * | 11/2004 | Palm et al. | 370/445 |
| 2005/0163060 A1 * | 7/2005 | Riley et al. | 370/254 |

FOREIGN PATENT DOCUMENTS

| | | |
|---|---|---|
| EP | 0414524 A2 * | 2/1991 |
| EP | 1 271 938 | 1/2003 |
| EP | 1271938 A2 * | 1/2003 |
| JP | 2002-199474 | 7/2002 |
| JP | 2003-087883 | 3/2003 |
| JP | 2003-259467 | 9/2003 |
| JP | 2003-338947 | 11/2003 |
| WO | WO 01/48977 | 7/2001 |
| WO | WO/ 0148977 | 7/2001 |

OTHER PUBLICATIONS

Jennings et al., SCSI; SearchStorage.com Definitions; 6 Pages.*

Miller et al., Starburst MFTP Specification, Apr. 1998; 62 Pages.*

Jennings et al.; SCSI; SearchStorage.com Definitions; 6 Pages.*

Miller et al.; Starburst MFTP Specification; Apr. 1998; 62 Pages.*

Bilan, "Streaming audio over bluetooth ACL links", Proceeding of the International Conference on Information Technology: Computers and Communication, IEEE, pp. 287-291, 2003.

Anonymous, "Onkyo Audio Network Receiver NC-500 Instruction Manual", Apr. 16, 2003. Retrieved from the Internet: <URL: http://www.onkyousa.com> on Sep. 1, 2004.

European Search Report, dated Mar. 17, 2008, issued in corresponding EP Application No. 05104359.4.

Office Action in Chinese Application No. 200510076156.9, dated Aug. 8, 2008.

Chinese Second Office Action in counterpart Application No. 200510076156.9 dated May 27, 2010, 48 pages.

Japanese Office Action in counterpart Application No. 2005167514 dated Dec. 7, 2010, 5 pages.

Chinese Third Office Action in counterpart Application No. 200510076156.9 dated Sep. 13, 2010, 9 pages.

* cited by examiner

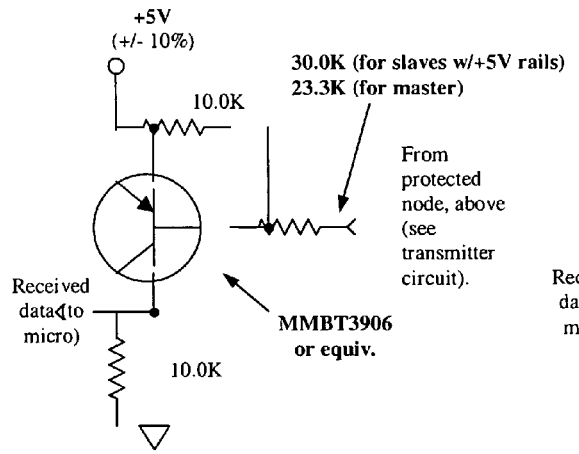
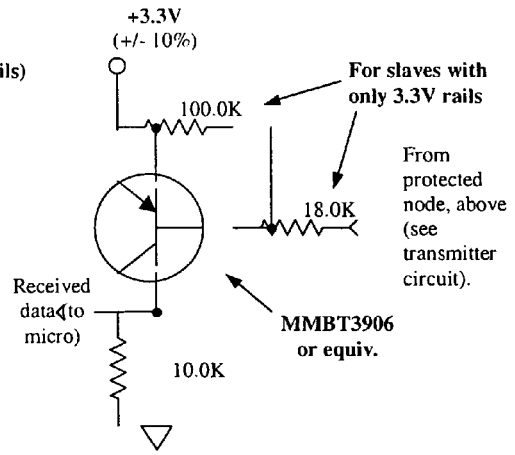
FIG. 5A    FIG. 5B
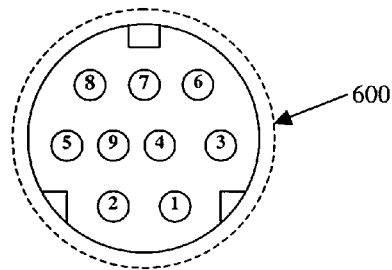
FIG. 6

MANAGING AN AUDIO NETWORK

BACKGROUND

This description relates to managing an audio network.

Members of a household can listen to different audio selections in various rooms, yet each room does not need additional sources. Centralized sources such as a CD changer or a digital music player connected to a master device in a primary room can be accessed and controlled from slave devices in other rooms that are in communication with the master device.

SUMMARY

In general, in one aspect, the invention features a method for a multi-zone audio communication network including at least one master device and a plurality of slave devices. The method includes receiving a message at the master device from a remote control or control buttons on the device that includes a command; and transmitting the command to the one or more slave devices.

Implementations may include one or more of the following features. The message is processed at the master device before transmitting and being used to control the slave devices. The command is passed through the master device to one or more slave devices without being processed at the master device. The remote control controls both the master and the slave devices. The command is transmitted over a first communications channel between a master device and the slave devices. The audio stream is multiplexed with the command over the first communications channel. The audio stream is transmitted over a second communications channel between the master device and the slave devices. The first communications channel comprises a wireless channel. The slaves are dynamically configured into multiple zones via the remote control. The slave devices are further connected to local audio sources, the slave devices choosing from the local audio sources and the audio streams for reproduction.

In general, in another aspect, the invention features a multi-zone audio network control system that includes: a master device; and one or more slave devices; the master device comprising circuitry to receive a message from a remote control or control buttons on the devices that includes a command; and transmit the command to the slave devices.

In general, in another aspect, the invention features a method for an audio communication network including at least one master device and a plurality of slave devices, the method comprising: controlling one or more slave devices from a master device using communication protocol comprising: assigning a plurality of priorities to messages; sending, from the master device to a slave device, a highest priority pending message.

In general, in another aspect, the invention features, a method for an audio communication network including at least one master device and a plurality of slave devices, the method comprising: controlling one or more slave devices from a master device using communication protocol comprising: assigning a plurality of priorities to messages; sending, from a slave device to the master device, a highest priority pending message in response to a polling message from the master device.

Implementations may include one or more of the following features. The highest priority pending message includes information for controlling the slave device.

In general, in another aspect, the invention features a method for an audio communication network including at least one master device and a plurality of slave devices comprising: controlling a plurality of audio devices from a master device including polling a first set of audio devices which are in an off state in a first cycle and a second set of audio devices which are in an on state in a second cycle, wherein the second cycle is shorter than the first cycle.

Implementations may include one or more of the following features. All members of the second set of audio devices are polled, then a single member of the first set of audio devices, and the step is repeated in a circular, round-robin fashion.

In general, in another aspect, the invention features a method that includes: controlling one of a plurality of audio devices from a master device to play from a source based on a zone associated with the audio device when the audio device is in an on state.

In general, in another aspect, the invention features a method that includes: controlling one of a plurality of audio devices from a master device including passing all commands for the audio device through the master device without processing at the master device when the audio device is in a local state.

In general, in another aspect, the invention features a method that includes: controlling one of a plurality of audio devices from a master device including monitoring keypresses from a remote control for the audio device when the audio device is in a not responding state.

In general, in another aspect, the invention features a method for message synchronization of an audio communication system, the method comprising: controlling a plurality of audio devices from a master device including transmitting a plurality of messages, where each message is sent as a continuous burst and a predetermined minimum time delay is maintained between an end of a first message and a beginning of a second message.

In general, in another aspect, the invention features a method for an audio communication system, the method comprising: controlling a plurality of audio devices from a master device over a wired network for one or more wired audio devices and over a wireless network for one or more wireless devices.

Implementations may include one or more of the following features. A reply is received in response to a poll message from each of the wired audio devices and aggregate polling information indicative of states of the wireless devices is received from one of the wireless devices. The one of the wireless devices providing aggregate polling information locally polls the wireless devices in a predetermined cycle. The aggregate polling information is sent by the one of the wireless devices in a predetermined time interval.

In general, in another aspect, the invention features a method for an audio communication system, the method comprising: transmitting a plurality of audio streams over a network; and controlling one or more audio devices on the network to play each one of the plurality of audio streams.

Implementations may include one or more of the following features. One of the audio devices is controlled to switch to playing a second of the plurality of audio streams based on a message from a master device on the network. The message comprises information designating the audio streams.

In general, in another aspect, the invention features a method for an audio communication network including at least one master device and a plurality of slave devices the method comprising: transmitting an audio stream from an audio source, including networked sources and local sources attached to the audio devices, to an audio device; and displaying information about the audio source on the audio device.

In general, in another aspect, the invention features a method for an audio communication network including at least one master device and a plurality of slave devices, the method comprising: transmitting a message consisting essentially of a header field, an address field, an argument field, and a verifier field.

Implementations may include one or more of the following features. The argument field of the message does not include any byte when the message is polling message and the most significant bits of the address field identifies audio zone for the audio devices to play and the least significant bits of the address field identifies the audio device being polled.

In general, in another aspect, the invention features a method for an audio communication network including at least one master device and a plurality of slave devices, the method comprising: receiving a message consisting essentially of a header field, an address field, an argument field, and a verifier field.

In general, in another aspect, the invention features a method for an audio communication network including at least one master device and a plurality of slave devices, the method comprising: assembling a message consisting essentially of a header field, an address field, an argument field, and a verifier field.

Implementations may include one or more of the following features. The message is transmitted.

In general, in another aspect, the invention features an audio communication protocol for an audio communication network including at least one master device and a plurality of slave devices, the protocol comprising: a message format consisting essentially of a header field, an address field, an argument field, and a verifier field. In some implementations, the argument field of the message does not include any byte when the message is polling message and the most significant bits of the address field identifies audio zone for the audio devices to play and the least significant bits of the address field identifies the audio device being polled.

Among the advantages of the invention are one or more of the following. The audio network control system can be operated with interchangeable slave devices (e.g., audio playback or audio information display devices). This allows multiple price points to be assembled by mixing and matching master devices and slave devices. The slave devices may use a common communication protocol. The master device does not need to know the specifics of the slave device's features or user interface. In addition to using a common communication protocol, slave devices can have a common set of behaviors. For instance, all slave devices can respond to mute, unmute, and volume commands in a similar manner. Alternatively, some slave devices (e.g., wireless devices) may share some common aspects of the common communication protocol (e.g., message format), but may differ in other aspects (polling procedures).

The audio network control system also provides the user with a seamless experience across multiple rooms and multiple remotes. The system can behave largely the same in a remote room as it does in the main room. A slave device can function largely the same with the master device remote as it does with its native remote. To accomplish this seamless behavior, the master device is able to dispatch commands received from a remote control (e.g., a radio frequency (RF) or infrared (IR) remote) to the appropriate slave device. To ensure interoperability with future slave devices with new features, the master device is able to pass unknown commands through to the slave device. The master device need not know what the command is. In this respect the master device functions as a router, determining where a command came from and where it should be sent to. In some cases (e.g. an audio source change command) the command is sent to the master device's command processor. In other cases (e.g. an unknown command), the command is routed directly to the slave device. This decision is based on the state of the slave device and the command received. In this way it is possible to create a system that is extensible to new types of slave devices.

Some slave devices can themselves be systems, and can include control integration for other connected devices. Such control automation will normally be accessed through the slave device's native remote. That control automation could be accessed from the master device's remote can be supported via the above routing mechanism. No additional processing need be done by the master device to accommodate control integration at the slave device.

A communication protocol includes prioritized messages to allow local buttons on a slave speaker to control a master console. While a salve device can send all kinds of messages, such as status, back to the console, the highest priority message is a "control" command, e.g., when a local button on a slave speaker is pressed. The control commands are used to control the master console.

Other features and advantages of the invention will become apparent from the following description, and from the claims.

DESCRIPTION OF DRAWINGS

FIGS. 5A and 5B are circuit diagrams of receivers.

FIG. 6 is a diagram of a pinout arrangement.

DESCRIPTION

1 Overview

Figure 1A:
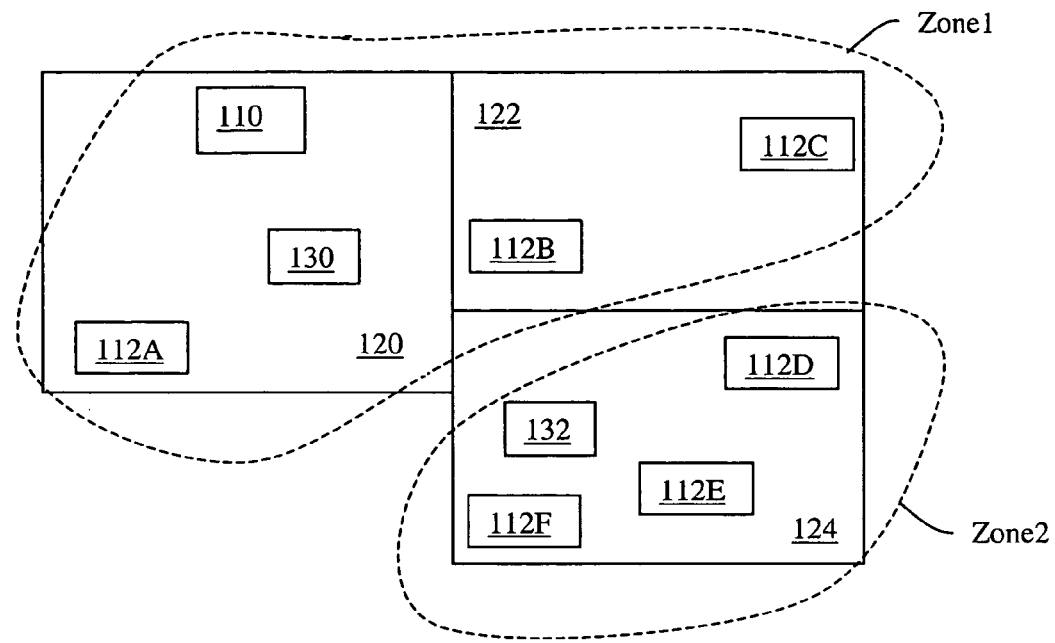
FIG. 1A is a diagram of an audio network control system in a multi-room environment.
Figure 1B:
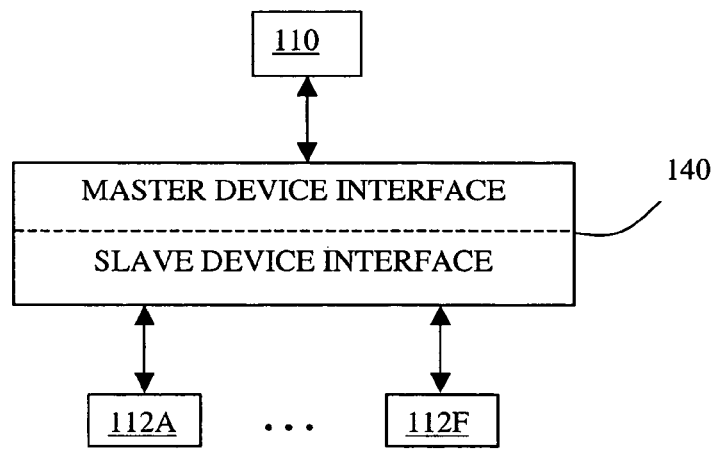
FIG. 1B is a diagram graphically representing a communication protocol for the audio network.

FIG. 1A shows an audio network control system 100 that includes a network of audio devices in a multi-room environment. The system 100 includes a master device 110 and slave device 112A in a first room 120, slave devices 112B and 112C in a second room 122, and slave devices 112D-112F in a third room 124. The master device 110 can include, for example, a stand-alone control console or a control program using communication abilities of a computer (e.g., desktop, laptop, or handheld computer). The slave devices 112A-112D can include any of a variety of devices including a speaker, an electronic device with an audio playback and/or recording capability, or a device collecting and/or displaying information about an audio stream. The slave devices are in communication with the master device 110 via a communications channel (e.g., a wired bus or a wireless channel) according to a communication protocol 140 that includes a master device interface and a slave device interface, as illustrated schematically in FIG. 1B.

A user can control any of the devices directly via local control buttons on a master or slave device or by using one or more remote controls, for example, remote control 130 for the master device or remote control 132 for a slave device. An IR remote control may provide controls similar to the controls located on the corresponding device. Commands from an IR remote control may propagate to a device located in the same room as the IR remote control. Commands from the IR remote control may cause the local device to change state in some way in response to the received command (e.g., turn on/off, change station, adjust vol., etc.).

In some implementations, one remote control, for example master remote control 130, can control both the master device 110 and the slave devices 112A-112D. For example, an RF remote control may control either a master device, one or more slave devices, or both master and slave devices. In some implementations the RF remote control does not directly control slave devices. Instead, a command issued from the RF remote control is first transmitted to the master device and then, either the master acts on the command or passes it through to a slave device for action.

In order to coordinate the fact that slave devices can be directly controlled or controlled through a single RF remote control, polling is used to obtain status information about a slave device. When a control on the slave device or on the IR remote control is used to change state of the slave device, the polling process obtains information about the changed state and provides it to the master device so that the master device knows the state of the slave (or in some implementations, a least a subset of states such as on/off status, volume level, and mute status). Commands directly issued to devices through a physical interface or via an IR remote control may be treated differently than commands issued via an RF remote control (or a remote control in the same room as the master device). An IR remote control in the same room as the master device can issue commands through the master device and thus act the same as an RF remote control located in a different room from the master.

A remote control can include a two-way remote control. For example, commands are issued from the remote control to the master device, and data is sent from the master device back to the remote control for display to the user. The data provided back can be status of the state of various devices connected to the network, or can be data associated with various functions of the master device, such as data contained on a hard drive containing digital works to be performed for a user.

In some implementations the slave devices 112A-112D are also in communication with each other. In some implementations, the audio network control system 100 includes more than one master device.

The audio network control system 100 can be divided into multiple "zones." Each device is identified by an address, each room is identified by a room code, and each zone is identified by a zone code. For example, Zone1 can include devices in the first and second rooms (Room A and Room B), and Zone2 can include devices in the third room (Room C).

Under normal operation, the master device continuously polls all connected slave devices to determine if they are on the network and turned on. For example, in one implementation, there are four possible states for a slave device: "On", "Off", "Local" or "Not Responding". Other implementations may include fewer or more than four states for a slave device. The master device's command processing proceeds according to the state of the slave device as follows.

In all states the master device 110 routes volume and mute commands from the master remote 130 to a slave device with a matching room code according to the communication protocol 140, as described in more detail below. When, as a result of polling, the master device discovers that a slave device has been turned "on," the master device 110 will activate the appropriate zone and begin playing the last selected source. If the zone is already playing, the slave device will join the current source for that zone. In the event that the master device 110 determines that all slave devices connected to a given zone are either "off" or "local," it will power down that zone.

When a slave device is in the "On" state, control commands which are known to the master device are processed natively by the master device Unknown commands such as from slave devices with new features not recognizable by the master device 110 are passed through to the appropriate slave device. This allows the master device 110 to be extensible to new classes of slave devices which may include additional new commands.

When a slave device is in the "Local" state, all commands, including transport commands, are passed through the master device 110 to the appropriate slave device. Transport commands are not processed locally by the master device 110. This allows fully context sensitive transport commands across all the master device 110 internal transports as well as the remote device's local transports.

When a slave device is in the "Off" state, all commands, including transport commands, are passed through the master device 110 to the appropriate slave device. This allows the slave device to be powered up by sending a local source select command or an On/Off command. In the case of an "On/Off" command, the slave device will power up in its previously selected source. If the source was the master device 110, the state is set to "On," which will be caught in the next polling cycle. This scheme is highly scaleable in that each slave device manages its own behavior, and the master device 110 needs to know only a minimal amount about each slave device.

When a slave device is in the "Not Responding" state (as will be the case for third-party amplifiers, for example), all commands, including transport commands, are passed through the master device 110 to the appropriate slave device, as for the "Off" state, described above. However, the master device 110 will manage on/off state variables for these slave devices by keeping track of on/off and source select keypresses from their remotes. This is so that the master device 110 will know when to properly shut-down a zone (e.g., when all rooms using it are off). If a slave device powers-up and begins replying on the network, the on/off state information in its replies will be given higher priority, and used to update the master device's 110 on/off state variables for that room.

2 Communication Protocol

The communication protocol 140 allows a master device to support a predetermined number of (e.g., 15 for an exemplary implementation) networked slave devices, each with a unique address (no more than one slave device may use a given address). These addresses are, e.g., RoomA, RoomB, RoomC, etc., up to RoomO (for 15 slave devices). A 16th address (RoomP, effectively) is reserved for broadcast messages (intended for all slave devices). These 15 slave devices may play either the Zone1, Zone2, or any of additional zones audio streams (or none) at any given time, in response to remote control commands. Therefore, for communication protocol 140, the room code alone can identify a specific slave device—and any zone information sent to a slave device simply informs it of the audio stream meant to be played.

The communication protocol 140 has "plug-and-play" capability. New slave devices can be added to the network at any time, without powering-down either the network or the other slave devices, and without turning off the master device 110.

One slave device address (e.g., Room0) can be used as a shared address and assigned to a Zone2 variable audio output on the master device 110. Volume Up/Down commands from an RF remote control set to this address initiates slave device messages and controls an internal volume control chip feeding this Zone2 variable audio output.

3 Master Device Circuitry
3.1 Overview

Figure 2:
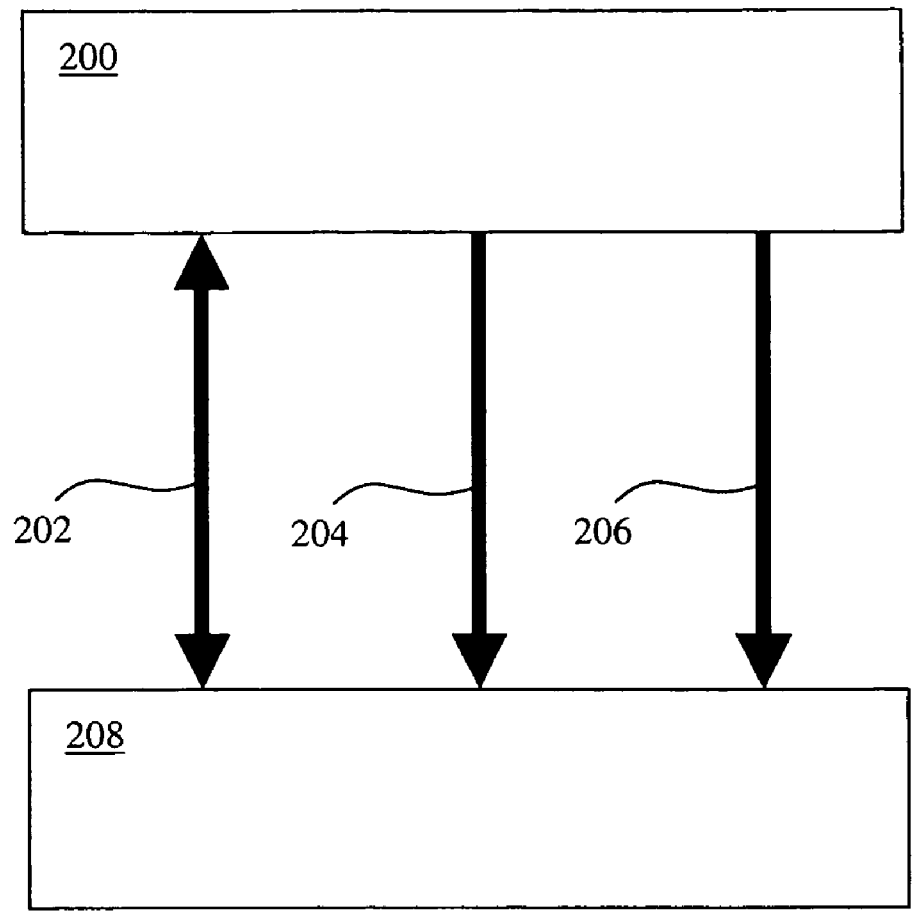
FIG. 2 is a diagram of a hardware interface for a master and slave device.

An implementation of a stand-alone console 200 master device is shown in FIG. 2. The hardware interface of the console 200 includes a control data bus 202, an audio interface 204, and a 10V Turn-On signal 206. the control data bus 202 is a two-wire (Data and GND), bidirectional, half-duplex interface intended to be connected from the console 200 to a networked slave device 208. All data and control messages are sent via this bus 202. Messaging is fixed at 19.2 kbps, and follows packetization and timing rules defined below.

Network lengths up to 150 feet (from the console 200 to the furthest slave device on any stub) can be supported, with cabling following either a daisy-chain or star configuration (or combinations thereof). Electrically, networked slave devices are wired in parallel.

The Data signal has a 1 kOhm pullup resistor to +5V at the console end, and idles at +5V (normally high) when no messages are being sent. Networked slave devices may optionally include a 1 MegOhm pullup resistor to a local +5V source to bias the Data signal to a known state when disconnected from the console. In some implementations, signaling (from the console 200 as well as networked slave devices) is achieved through open-collector transistors which pull the Data signal to a local GND.

3.2 Transmitter Details

Figure 3:
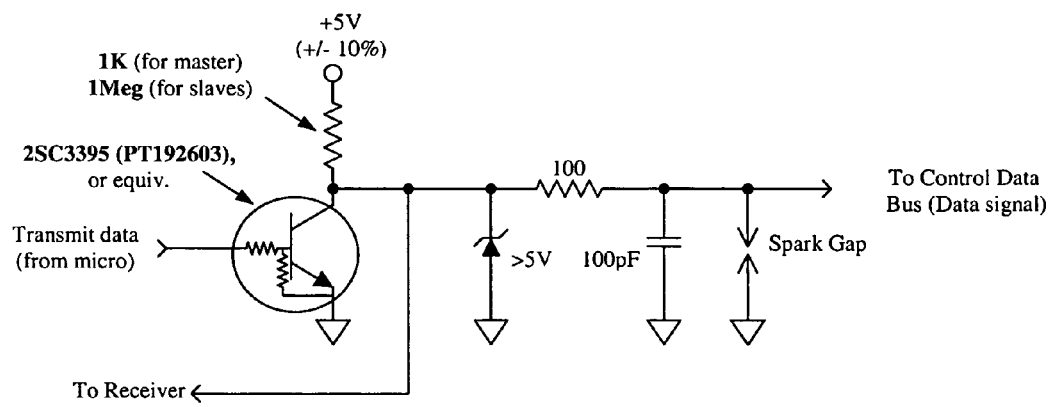
FIG. 3 is a circuit diagram of a transmitter.

In this example, each slave device interfaces to the bus 202 signals through an open-collector transistor capable of tolerating +5V, and able to fully pull-down (guaranteeing saturation) with the worst-case pullup resistance (about 650 Ohms, factoring in the effect of 15 slave devices). Since the bus 202 may be strung throughout a home, and potentially past significant electrical noise sources, filter/protection components should also be provided (100 pF, max on bus). An exemplary output section of a bus transmitter is shown in FIG. 3. Other transmitter topologies are possible. Electrical parameters of the transmitter are as follows:

| Parameter | Allowable Value |
| --- | --- |
| Capacitance connected directly across the bus (Speaker Data to ground) | 105 pF, max (100 pF, 5% capacitor, max). |
| Transmit logic Low on the bus | <1.0 V, max. with a test circuit consisting of a 618 Ohm pullup resistor from Speaker Data to +5 V (modeling the effect of 15 worst-case receivers). This is roughly equivalent to the performance of a saturated NPN with 100 Ohms series resistance, as suggested. |
| Transmit logic High on the bus | High impedance at the transmitter (open-collector NPN). Local transmitters may have no less than 1M Ohm, min, pullup to a local +5 V rail. |

Figure 4:
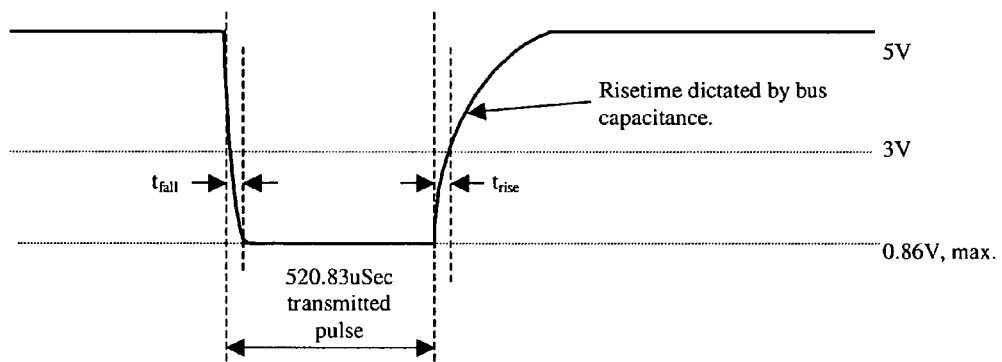
FIG. 4 is a pulse timing diagram.

120 feet of speaker cable would load the network with about 0.01 uF of extra capacitance. Therefore, the waveform shown in FIG. 4 would represent a worst-case drive waveform for a start bit driven by a slave device onto a maximum-length network loaded by the worst-case number of speakers. Note the widening of the bit due to bus capacitance. Bit falltimes should be about 10 times faster than risetimes. The parameters for this example are as follows:

| Parameter | Worst-Case Value |
| --- | --- |
| Maximum expected total load capacitance | .012 uF, including cable capacitance and 105 pF filter capacitors per network device. |
| Worst-case data fall time ($t_{fall}$) | 0.6 uSec (time to fall from 5 V to 3 V, with .012 uF capacitance and a maximum number of network devices). |
| Worst-case data rise time ($t_{rise}$) | 11.2 uSec (time to rise from 0.2 V to 3 V, with .012 uF capacitance and minimum number of network devices). |

3.3 Receiver Details

Bus receivers detect low-going transitions on the network and relay them to a microprocessor. The receiver circuit sets a low-going receive threshold at about 2.6V for slave devices and 3V for the console 200. No hysteresis is provided in this example. Therefore some multiple-transitions may be experienced on the edges of noisy bits. Slave devices should add hysteresis in the event that their receive algorithms cannot tolerate these transitions. Standard Universal Asynchronous Receiver/Transmitter (UART) devices and other schemes which sample bits near the center of bit cells, for example, will tolerate multiple transitions. Receive schemes which decode data by using edge-triggered interrupts to measure network high/low times might require hysteresis, unless sufficient delay exists in the interrupt service routine before re-arming. Ideally, software should implement a debounce scheme to implement pseudo-hysteresis, regardless of the circuit used.

Bus receivers should also tolerate network transients. The receiver circuit is therefore tapped off the protected node of the transmitter output stage, as shown in FIG. 3. In this topology, all data transmitted by a network slave device will be fed back into its own receiver. Software should be robust enough to tolerate this. Exemplary +5V and +3.3V bus receiver circuits are shown in FIGS. 5A and 5B, respectively. Electrical parameters of the transmitter are as follows:

| Parameter | Allowable Value |
| --- | --- |
| Low-Going Receive Threshold | 2.6 V, nominal, for slave devices. 3.0 V, nominal, for console |
| Maximum allowable current drawn from the bus when in the logic "high" state. | 33 uA, max. (Equivalent to a 150K Ohm resistor to ground.) |
| Maximum source current drawn from a slave device receiver when the bus is in a logic "low" state. | 150 uA, max. (Equivalent to a 33.3K Ohm resistor to +5 V, or a 22.0K Ohm resistor to +3.3 V.) |

3.4 +10V Turn-On Line

The console 200 provides a +10V Turn-On signal 206. This signal is low (2.2K pulldown to GND) when no slave devices are active on a given Zone, and high (current-limited high-side PNP switch, providing from +8.8V to +10V depending on load). Maximum drive capability is about 75 mA at +8.8V. Therefore, if slave devices use this line for any other purpose (Energy Star, etc.), care should be taken to avoid drawing more than 5 mA per slave device (5 mA=75 mA/15 slave devices). Any such current draw should also be only temporary, to reduce console power dissipation.

3.5 Audio Interface Details

The slave device interface includes the audio interface 204 as well as the control data bus 202 described herein. One type of audio signal output for networked slave devices is fixed output (e.g., always sent at full volume). Volume control is implemented in the slave devices. This provides maximum signal-to-noise ratio at the slave devices. A variable output is also provided, e.g., to support legacy slave devices. One or more audio signal outputs may be analog, digital or a combination of analog and digital outputs. The distribution of audio signals will be described below in terms a network of slave devices, a "smart speaker system," including "smart" speakers that have the ability to communicate with the master device 110 according to the communication protocol 140.

For a "main room" smart speaker system, the console 200 provides a S/PDIF-based differential digital audio stream on the Zone1Speaker Output mini-DIN, pins 1 and 2, as described in detail below. This audio stream is configured for a (non-standard) 3 Vpp output level, when loaded by the speaker, and is transformer-isolated and balanced. 390 pF filter capacitors to ground are added to reduce emissions. The console 200 is capable of generating an audio stream at any of a variety of data rates (in frames per second (FPS)), for example, 48 kFPS up to 192 kFPS. The console 200 is capable of generating digital audio in any of a variety of compressed formats, for example, PCM, AC-3, DTS, MPEG2, or AAC formats. The compressed formats are identified and decoded by the speakers.

For "non-main room" smart speaker systems throughout the house, a pair of analog stereo outputs (left/right for Zone1 and left/right for Zone2) are provided on the Zone2 Speaker Output mini-DIN connector, as described in detail below. These left/right pairs are both fixed-output. Full-scale (maximum) output signals are about 2 Vrms, with typical playback levels being about 300-400 mVrms. Playback levels for console internal and external audio sources have been gain-scaled in the console to play at equal amplitudes.

These outputs are standard, single-ended analog outputs, driven essentially by op amps, with about 50 Ohms added series resistance on each output. 47 uF DC blocking capacitors are added in the console to each output signal, followed by 100K resistors referencing each to the console's analog ground. It is expected that this output impedance can drive up to 15 speakers (with input stages defined below) without suffering either unwanted attenuation or loss of low-frequency response. Cabling guidelines are provided below to guarantee proper zone/zone isolation and noise shielding.

The Zone2 Speaker Output connector pins 1 and 2 also provide a left/right variable analog signal pair, for variable-input speakers. These signals are identical to the Zone2 fixed outputs on pins 3 and 4, but are able to be attenuated by a Zone2 volume control chip inside the console 200.

Long lengths of audio cable routed through a house have been found to be susceptible to picking up audible amounts of noise. Speakers interfacing to the control data bus 202 should therefore configure differential amplifiers ("diff amps") at their audio input stages. As a reference for these differential amplifier inputs, a dedicated Audio Reference will be sent from the console 200 and included with the other network conductors. Cabling details are described below. In some implementations, features of a networked speaker's audio interface include:

- Zone1 and Zone2 input diff amp circuits should be identical (same gain, noise floor and bandwidth, consistent with the audio quality goals of the speaker).
- Diff amps should be used, with all legs equally balanced.
- Resistance looking into each leg from the network should be 20K Ohms or greater. This allows diff amps configured with 10K Ohm resistors in each leg, for example.
- Each leg should be capacitively coupled to the network, with all capacitors of equal value. Each networked slave device may have its own capacitor values, based on desired frequency response.
- The dedicated Audio Reference signal should be used for diff amps: Zone1 Left/Right as well as Zone2 Left/Right. To avoid audio currents flowing back into this signal which could destroy Zone1/Zone2 isolation, Audio Reference should be used for the NON-INVERTING legs of the diff amps only. No more than 1 micro-Amp, rms, of audio current should be induced onto the Audio Reference signal. This maintains 92 dB isolation (considered an acceptable minimum).

Smart speakers developed to interface with the console 200 will have the ability to select one of two possible audio streams: the Zone1 stream or the Zone2 stream. Selection will be controlled via smart speaker commands. Smart speakers should therefore provide a 2-input, stereo audio multiplexer (MUX) at its network audio input, under control of the microprocessor managing smart speaker messages. Configuring this MUX ahead of the diff amps, to save cost, should be done carefully, to avoid diminishing their performance or removing some of the above features.

3.6 The Console Speaker Output Mini-DIN Connectors

The console 200 has two 9-pin Speaker Output mini-DIN connectors, one for Zone1 and one for Zone2. FIG. 6 shows an exemplary pin arrangement looking into a 9-pin mini-DIN connector (as when plugging into it). The connector includes a conductive shell 600. The pinouts for the connectors are as follows:

ZONE1:
- Pin 1: S/PDIF0 digital audio signal for main speaker (Z1_NET0).
- Pin 2: S/PDIF1 digital audio signal for main speaker (Z1_NET1).
- Pin 3: Zone1 fixed Left analog audio signal (Z1_LEFT). Not variable.
- Pin 4: Zone1 fixed Right analog audio signal (Z1_RIGHT). Not variable.
- Pin 5: GND.
- Pin 6: +10V Turn On signal for Zone1 (Z1_TURNON).
- Pin 7: Smart Speaker Data for Zone1 (Z1SPKR_DATA).
- Pin 8: GND.
- Pin 9: No connect.
- Shell: GND.

ZONE2:
- Pin 1: Zone2 variable Left analog audio signal (OUTL-VAR).
- Pin 2: Zone2 variable Right analog audio signal (OUTR-VAR).
- Pin 3: Zone2 fixed Left analog audio signal (Z2_LEFT).
- Pin 4: Zone2 fixed Right analog audio signal (Z2_RIGHT).
- Pin 5: Buffered Zone1 fixed Right analog audio signal (BZ1_R).
- Pin 6: +10V Turn On signal for Zone2 (Z2_TURNON).
- Pin 7: Smart Speaker Data for Zone2 (Z2SPKR_DATA).
- Pin 8: GND.
- Pin 9: Buffered Zone1 fixed Left analog audio signal (BZ1_L).
- Shell: GND.

3.7 The Input Mini-DIN Connector for Networked Speakers

Networked smart speakers will likewise have a 9-pin mini-DIN connector for connecting to the bus 202. This one connector takes in Left/Right audio for both Zone1 and Zone2, a well as the Data line, digital ground, and a separate ground to use as a reference for the audio diff amps. Optionally, the +10V Turn On signal could be brought in, as well. Although all-together this amounts to only 8 conductors, the speakers will be defined to use a 9-pin mini-DIN identical to the console's (though only a single, as opposed to a dual) to allow cables to be reversible.

The speakers' mini-DIN is pinned-out as follows:
Pin 1: Unconnected (console's Zone2 variable Left analog audio).
Pin 2: Unconnected (console's Zone2 variable Right analog audio).
Pin 3: Zone2 fixed Left analog audio signal.
Pin 4: Zone2 fixed Right analog audio signal.
Pin 5: Zone1 fixed Right analog audio signal.
Pin 6: +10V Turn On signal for Zone2.
Pin 7: Smart Speaker Data for Zone2.
Pin 8: Audio Reference (dedicated ground for diff amps). Not tied to speaker's product ground.
Pin 9: Zone1 fixed Left analog audio signal.
Shell: GND, used as the speakers' digital (product) ground. Not shorted to pin 8 GND in the speaker.

3.8 Cabling Details

Figure 7:
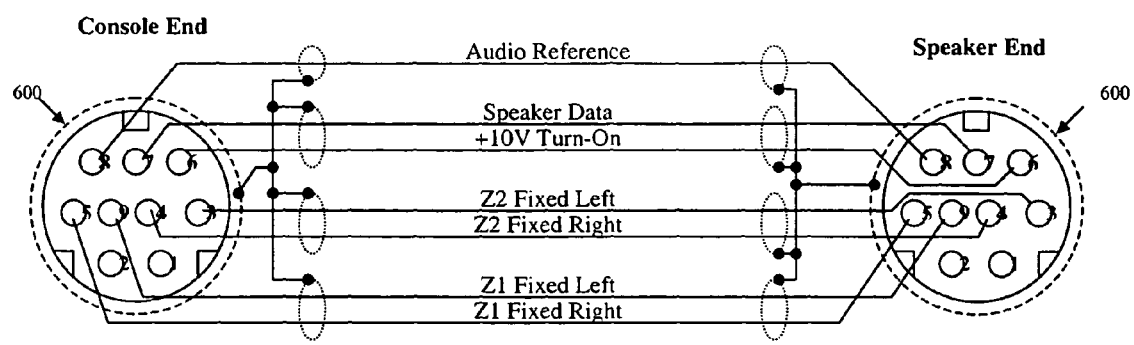
FIGS. 7 and 8 are diagrams of pinout connections.

In some implementations, cables to connect smart speakers to the console 200 Zone2 Speaker Output have a 1:1 pass-through of pins 3 through 9, with separate shields as shown in FIG. 7. Pins 1 and 2 are not connected, and the cable is reversible. When using an 8-conductor cable with 4 shielded twisted pairs (available from Bose Corporation, part number 257187) to connect speakers to the console 200, connections can be made as shown in FIG. 7.

Some legacy speakers (AM5P/AM20P, Bose Corporation) can plug directly into the Zone2 Speaker connector and operate properly, and can co-exist with newer speakers (LSA2, A2 and Ballpark, Bose Corporation). They use the Zone2 Variable Left/Right signals on pins 1&2, as well as the +10V Turn-On Line on pin 6. Pin 8 is used to shield the Turn-On line and provide speaker ground. The shell 600 ground is used for Audio Reference in this speaker. These cables will internally short pin 5 to the shell ground, making the Zone1 Fixed Right output unusable for new speakers—a special splitter is used to prevent this (connecting the console shell to the splitter output's pin 5, but leaving this output's shell floating) if these speakers need to share Zone2 with new speakers.

Figure 8:
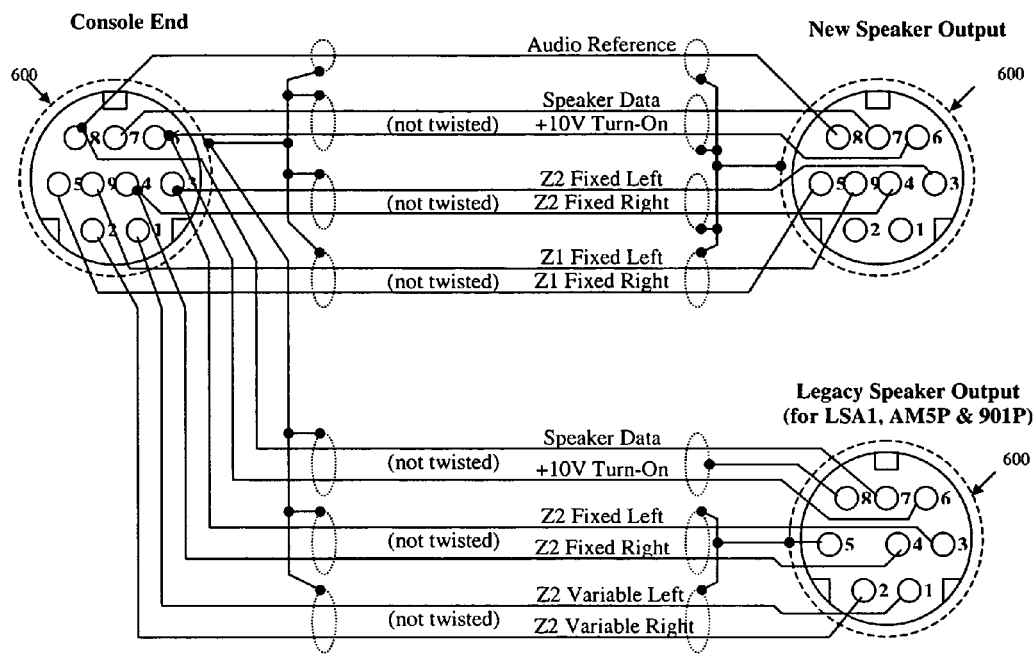

If any legacy speaker cables are plugged into the Zone2 Speaker Output of the console 200, the Zone1 Fixed Right audio output signal on pin 5 is shorted to ground. Since the Fixed Right audio output is buffered, it is safe to short this signal to ground if newer-style speakers do not need to be supported. However, if new speakers are to be mixed with legacy speakers, a special splitter is to be used. The connections in this splitter are as shown in FIG. 8 (console end is male, Speaker Output ends are female).

The splitter's Legacy output has the following features:
1. Cables plugging into it which short pin 5 to the shell will not short Z1 Fixed Right to GND.
2. Its pin 8 ground can be used for digital GND (for the Data signal, as well as +10V Turn-On).
3. Its shell ground is shorted to pin 5, and can be used for Left/Right audio shielding.

The splitter's New Speaker output is a full pass-through of pins 3 through 9 (and shell) from the console mini-DIN. New Speakers will never use the pin 1-2 Variable audio signals, and in fact may use pins 1-2 as audio outputs for accessories (Ballpark pedestals, for example), so these are not included in the splitter.

4 Communication Protocol Details

The communication protocol 140 uses a one-wire (two wires, including ground), bidirectional, half-duplex, signaling scheme between the console 200 and a set of networked speakers.

All communication is sent via the Speaker Data conductor on the cables run from the Speaker Output mini-DIN connectors on the back of the console 20 to the networked speakers. The idle state for this signal is a logical high (+5V), pulled-up via a 1K Ohm resistor in the console. Transmissions are achieved by directly keying open-collector transistor stages in the console 200 and speakers.

The protocol 140 uses a 19.2 k bps bit rate, one start bit, one stop bit and no parity bits. Message bytes are defined below. In the following examples, all message bytes are sent LSB (least significant bit) first.

4.1 Allowable Logic Levels

Logic levels for signaling are as follows (as seen on the Speaker Data conductor of the bus 202):

| Message Bit | Logic Level on the Smart Speaker Bus | Notes |
| --- | --- | --- |
| Idle State | Logic High | Console pullup to +5 V. |
| Start Bit | Logic Low | Open-collector pulldown to GND. |
| Data 0 | Logic Low | Open-collector pulldown to GND. |
| Data 1 | Logic High | Console pullup to +5 V. |
| Stop Bit | Logic High | Console pullup to +5 V. NOTE: same as return to Idle state. |
| Xmit Logic Low | 1 V, max on bus. | Only one device transmitting. 1K pullup to +5 V at the console. |
| Xmit Logic High | 4.5 V, min on bus. | With 15 receiver loads. 1K pullup to +5 V at the console. |
| Rcv Logic Low (slaves) | <2.6 V | Console pulls all the way to .1 V. |
| Rcv Logic Low (console) | <3.0 V | Slaves pull down through series |
| Rcv Logic High (slaves) | >2.6 V | |
| Rcv Logic High (console) | >3.0 V | |

4.2 Bit Widths

The 19.2 kbps data rate used by all networked devices are guaranteed to be within 0.5% of the nominal rate. This ensures edge accuracy out to each byte's Stop bit of +/−5% (+/−10%, assuming worst-case timing error for both the transmitter and receiver). Bit widths are therefore defined to be as follows:

| Message Bits | Bit Widths | Tolerance |
| --- | --- | --- |
| All (Start Bit, Stop Bit, Data 0, Data 1) | 52.083 uSec, nominal. | +/−.5% (+/−.26 uSec). NOTE: Allowable error includes all clock error due to crystal accuracy, temperature drift and aging, etc. |

These tolerances apply to bit widths as generated by bus transmitters. Actual received bit widths may be distorted on worst-case networks.

4.3 Message Timing

To provide speaker synchronization, messages are packetized (sent as one continuous burst, without delays between bytes), with inter-message timings controlled as follows:

| Parameter | Timing | Notes |
| --- | --- | --- |
| Longest logic High time within the body of a message. | 9 bits = 469 uSec, nominal, at 19.2 kbps. | This would correspond to a byte with value 00 h. Included here for reference only. |
| Allowable delay between message bytes (console or speakers). | 0 uSec. | Message bytes are sent out as one continuous burst, without pauses between. |
| Network idle time before sending console messages ("Synchronization Delay") | 1.066 mSec, min. | End of the last stop bit (from speaker or console) to beginning of console's start bit. |
| Allowable delay between the end of a console message and the start of a speaker's reply. | 767 uSec, max. | End of the console's last stop bit to the beginning of the speaker's first start bit. |
| Allowable delay between console queries and speaker replies. | TBD by high-level software. | Speaker reply, when ready, waits to be sent following (within 767 uSec) the next poll from the console. |

Figure 9:
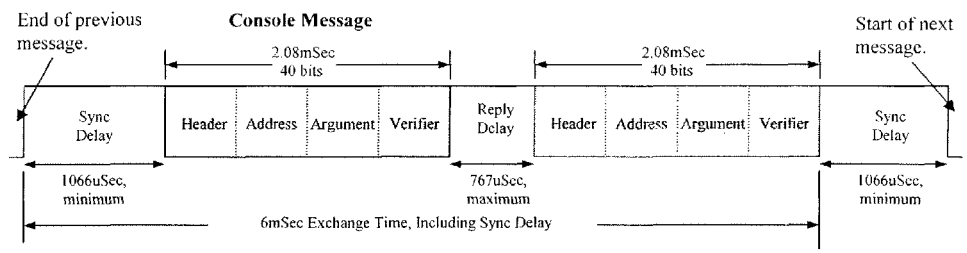
FIGS. 9 and 10 are timing diagrams for a communication protocol.

An exemplary message for a common 4-byte command and reply, as seen on the network is shown in FIG. 9 (the bus 202 idles high).

4.4 Message Synchronization

As shown in the table above, the console 200 ensures that the network has been idle for at least 1.066 mSec before initiating a new transmission. This delay is intentionally longer than the allowable delay between console messages and speaker replies, so that devices on the network can use simple timeouts to re-synchronize with the console whenever necessary (ideally, on an ongoing basis). The recommended timeout for speakers to use for re-synchronizing to the console is 916 uSec (916 uSec=767 uSec+(1.066 mSec−767 uSec)/2.). If a speaker identifies that the network has been idle for 916 uSec, that speaker can re-arm its receive routine and will properly capture the next console message from its beginning.

Speakers can identify the end of an inbound console message by waiting for the first network idle time of safely greater than 469 uSec (the longest possible string of 1's within the body of a message). The recommended timeout is about 521 uSec. This gives speakers 246 uSec to examine the received message and begin its ACK/reply before 767 uSec.

If these message timings are adhered to, no loss of synchronization should occur (network devices should never improperly lose track of where the beginning and end of messages are). Nonetheless, message address and verifier bytes should be examined to confirm that all received messages are valid. Furthermore, if a network idle time long enough to identify the end of a message is detected, any partially-received messages less than 4 bytes long should be deleted, and re-synchronization should take place.

4.5 Software Drivers 4.5.1 Low-level Receiver

Standard hardware UART receivers provide protection against noise and jitter/slew distortion. To approximate this performance in software where hardware UART's are not available, a bit-banged receive routine works as follows:

1. After synchronization has been confirmed and an inbound message can be expected, the data input should be armed with an edge-triggered interrupt.
2. When the first edge of a message is detected (the first start bit of the first byte), it should be debounced by immediately re-sampling 1-2 more times to reject noise (though noise should be extremely rare on typical networks). If found to be valid, a state machine driven by auto-reloaded 52.083 uSec timeouts should be implemented to sample the next 10 bits as close to the center of the bit cells as possible.
3. The first 8 stages of this state machine will collect message bits. Each of the 8 message bits should be quickly sampled 1-3 times at the center of the bit cell, and the proper value stored away.
4. The timer interrupt routine for the 9th bit (the stop bit) should confirm that the bus is in the idle (high) state, and re-arm the edge-triggered interrupt for the next byte's start bit.
5. If a new byte's start bit edge is detected before the 10th 52.083 uSec interrupt, cancel the 10th timer interrupt and assemble a new incoming byte as before (using this edge to re-synchronize the timing of the 10-bit sampling engine). However, if the 10th 52.083 uSec interrupt expires first, the message is over. Process accordingly. Slaves can immediately begin generating their reply.

4.5.2 Transmit/Receive Timing for the Master Device

In some implementations, the console 200 has a hardware UART assigned to the smart speaker interface. The following scheme will minimize the interrupts associated with managing this UART:

1. Transmit the full outbound message at once (N bytes), setting the UART to interrupt the system when done. For messages longer than the 16 byte maximum UART buffer in the CS98200 (rare), interrupts are used to transmit the messages piecemeal, in the largest blocks possible (up to 16 bytes). This should be done introducing no noticeable delays between bytes.
2. Once the outbound message is finished, enable the UART receiver and set it to interrupt after one received byte (first interrupt should occur within 1.288 mSec where 1.288 mSec=767 uSec Reply Delay+520.83 uSec first byte length). Also arm a timer interrupt to expire in about 1.34 mSec.
3. If the 1.34 mSec timer interrupt expires before the first full byte is received from a slave, assume that the slave is not active and advance to poll the next slave.
4. Otherwise (if a slave is replying), continue to interrupt on every received byte. Subsequent bytes should be received every 520.83 mSec. However, since a 1.066 mSec Synchronization Delay is used before a console message, a 1.066 mSec timeout (reset after every received byte) should be used to detect the end of slave messages.

Figure 10:
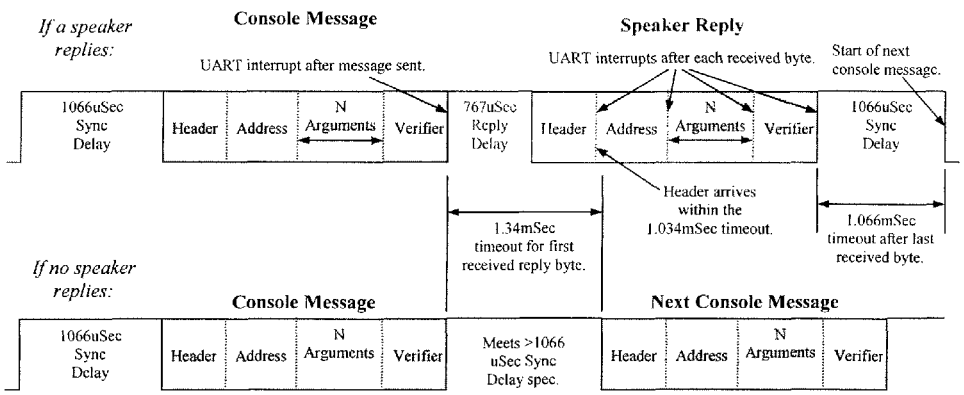

FIG. 10 shows messages sequences in the case of a reply from a speaker, and in the case of no reply from a speaker.

5.0 Message Packet Overview

A message packet is defined as a set of bytes sent by a bus master (e.g., a console) or slave (e.g., a speaker). All bits of a message packet are set as one continuous burst, without interruptions or delays between bytes. Messages of various lengths are supported. Some implementations use the Header/Address/Argument/Verifier format described below.

5.1 Header Byte (1st Message Byte)

Messages on the bus 202, whether from the console/master or a speaker/slave, begin with a 1-byte Header (this is the first byte transmitted). Bit 7 of this Header is reserved to indicate whether the message is sent by the console 200 or a speaker. Bit 7 is set to 0 for console messages, and set to 1 for speaker messages.

Figure 11:
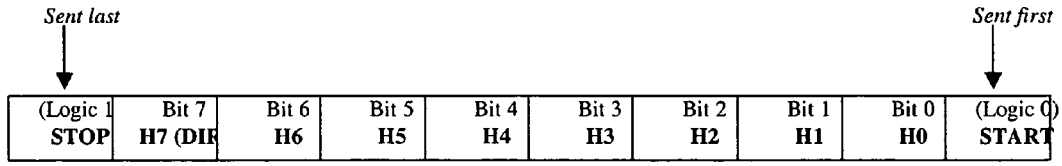
FIGS. 11-15 are bit sequences for data fields.

A diagram of the full Header Byte, including the start and stop bits, is shown in FIG. 11.

H7 . . . H0 (Bits 7 . . . 0): 8-bit Header identifier (see Header Definitions, described below). 256 separate commands are therefore possible (128 from the console to speakers, and 128 from speakers back to the console, since bit 7 identifies the sender).

DIR (Bit 7): 1-bit Message Direction Indicator (0=sent from the console/master, 1=sent from speaker/slaves).

5.2 Console Message Address Byte (2nd Message Byte)

Figure 12:
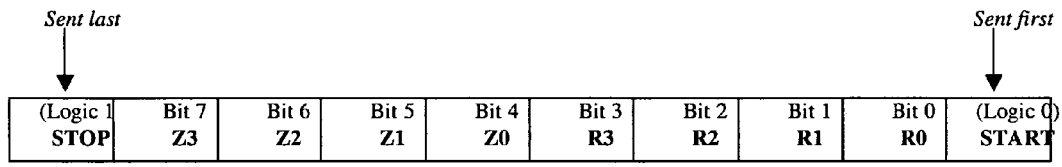

For smart speaker messages, the 2nd byte contains message addressing. A diagram of the Address byte is shown in FIG. 12.

R3 . . . R0 (Bits 3 . . . 0): Room Number (0000-1111b). 15 unique rooms are allowed (referred to as A-O). 0000b=RoomA. 0001-1110b=RoomB-RoomO. 1111b=ALL ROOMS, is used for broadcasts.

Z3 . . . Z0 (Bits 7 . . . 4): Zone Number (0000-1111b). 15 unique zones are allowed. Each zone can be used to identify a desired audio stream.

0000b=Zone1. 0001-1110b=Zone2-Zone15. 1111b=ALL ZONES, is used when console messages should not cause speakers to change their input stream/zone selections.

Examples of the address byte (neglecting start/stop bits) are: Zone 1, Room A: 00000000b. Zone 2, Room I: 00011001b.

The zone information contained in the Address byte is passed-through the console 200, e.g., from an RF remote control, and identifies an audio stream selected by a speaker. Examples of valid options are: Zone1 (0000b), Zone2 (0001b) and ALL Zones (1111b). Other options are possible. For example, some options support each room having its own (independent) audio stream.

5.3 Speaker Message Address Byte (2nd Message Byte)

Figure 13:
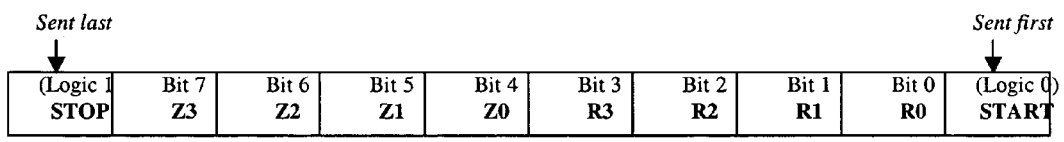

The speaker Address byte allows speaker replies to indicate whether a speaker is OFF, or is listening to (one of its possible) Local sources, or listening to one of the streams sent from the console 200 (Zone1 or Zone2). The format for this byte is shown in FIG. 13.

R3 . . . R0 (Bits 3 . . . 0): Same as defined for the console 200: indicates one of 15 possible rooms, but with 1111b undefined for speakers (since speakers do not reply to broadcasts).

Z3 . . . Z0 (Bits 7 . . . 4): 0000-1101b: Playing one of 14 possible Zones (0010b=Zone1, 0011b=Zone2, etc.).

1110b: Playing a local source.

1111b: OFF. Presently playing no local or networked sources.

5.4 Argument Byte(s)

Figure 14:
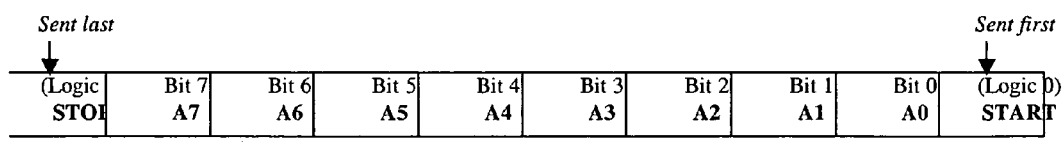

After the Address byte, and before the Verifier byte which ends messages, are contained the messages Argument byte(s). Polls do not contain any argument bytes. Some smart speaker messages contain only 1 Argument byte, but speaker messages may contain any number of Argument bytes. Message definitions and details of the Argument bytes used in various commands are described below. Each Argument byte is sent in the format shown in FIG. 14.

A7 . . . A0 (Bits 7 . . . 0): 8-bit message arguments.

5.5 Verifier Byte (Last Message Byte)

Figure 15:
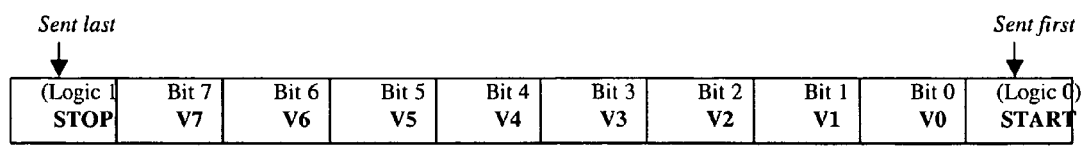

The final byte of smart speaker messages is a Verifier byte. This byte is used to confirm that the basic message information has not been corrupted. As shown in the message definitions below, this byte is generally a software exclusive OR (XOR) of all preceding message bytes, though longer message forms may wish to use this to verify Header/Address only, and include local checksums, etc., within the Argument fields to more robustly verify the bulk of the data payload. The format for the Verifier byte is shown in FIG. 15.

V7 . . . V0 (Bits 7 . . . 0): Generally an XOR of all preceding message bytes.

6.0 Rules for Exchanges

An "exchange" is defined as a set of two bus messages: a message from the console 200 to specific speaker, and the subsequent reply sent from that speaker in return. One set of rules that govern such exchanges is:

6.1 Only the Master Generates Spontaneous Messages

The console 200 is the master of all communication on the smart speaker bus 202. For example, only the console 200 generates spontaneous transmissions on the bus 202.

6.2 The Master does not Interrupt an Exchange in Progress

Regardless of the importance of a message pending with the console/master, outbound transmissions wait until previously-initiated exchange cycles are completed before initiating a new transmission. Messages in progress either from the console 200 or speakers are not interrupted.

6.3 A Slave Only Transmits Immediately Following Messages Addressed to it

A slave/speaker is only allowed to transmit immediately following console messages addressed specifically to it (e.g., no slave transmits following a console broadcast). This rule holds, regardless of the importance of the speaker message pending. It is the console's responsibility to send messages (polls, for example) to each speaker frequently enough to guarantee timely opportunities for speakers to communicate back upstream.

6.4 A Slave Replies to Messages Addressed to it

Unless a speaker is OFF (where replies are optional), a slave/speaker replies to a console message addressed to it with some form of return message (where the default reply is the Poll_Reply for situations where slaves have nothing significant to communicate at the moment). Replies are generated within the allowable delay period (e.g., 767 uSec).

Speakers may reply to console messages with any one of the following message types:

a Poll_Reply message (4 bytes). This is the default speaker reply, used following all polls, commands, and queries unless higher-priority responses are available to be sent (including query replies).

a PASS_KEY_CODE Message (see message definitions).

a DOWNLOAD_INFORMATION Message (see message definitions).

6.5 A Slave Replies with the Highest-Priority Information Currently Pending

A speaker/slave may have multiple messages pending when an opportunity comes to transmit back to the console 200. In this situation, the highest-priority message should be sent. The general guidelines for possible message types are as follows:

6.5.1 Highest Priority: Non-Poll Query Replies

If the console 200 has sent a specific query message (other than a "poll"—see message definitions) to a speaker, the speaker sends the proper reply as soon as possible. Lower-priority replies can be sent until the query reply is assembled, but, once assembled, it is given the highest priority in the outbound queue.

6.5.2 Medium Priority: Pass_Key_Code Messages

Some buttons pressed on the speaker/slave products (or their local remote controls) may require urgent changes to the console audio sources, etc. A Pass_Key_Code message is defined below to transport appropriate presses to the console 200. These messages should be given a medium priority in the slaves' outbound queues (they should pend when query replies are available in the queue, but take precedence over poll replies).

6.5.3 Medium Priority: Download_Information Messages

A Download_Information message is defined below to allow speaker/slaves to communicate blocks of data up to the console 200. It is expected that this data would typically represent information related to local sources being played on the slave (a current AM/FM station, for example). Such messages are given a medium priority, identical to Pass_Key_Code messages. They should therefore be buffered in a FIFO with Pass_Key_Code messages, taking precedence over poll replies, but pending when all other specific query replies are in the queue.

6.5.4 Lowest Priority: Poll Replies

The default reply, referred to as the Poll_Reply (see message definitions) should be sent when no other speaker message is in the outbound Smart Speaker queue. This reply contains only basic information concerning the speaker's on/off state and its volume level, deemed less important than the other classes of replies.

6.6 A Master Continuously Polls all Speakers, but as a Low Priority

To allow speakers to send information upstream to the console 200 in a timely manner, polling messages are sent, and are used as an opportunity to keep aware of speaker status changes. As with console messages, speakers may optionally reply to polls with any of the message types listed above. Full timing details of the console polling cycle are described below. Generally, these polls are sent continuously, but only while no higher-priority messages are available in the console's outbound queue.

6.7 A Master Transmits the Highest-Priority Message Currently Pending

As with slaves, the console/master outbound messages are assigned priorities. Higher-priority messages are given precedence over those with lower priorities, as follows:

6.7.1 Highest Priority: Non-Poll Queries and Control Messages

If a query or control message needs to be sent to specific speaker, it takes highest priority. See message definitions.

6.7.2 Medium Priority: Pass_Key_Code Messages

The console 200 is capable of passing-through RF commands unused by the console directly to the speaker. The Pass_Key_Code message, defined below, is used for this. Such messages have a lower priority than queries, but a higher priority than polls. When a Pass_Key_Code message is pending, the polling cycle is interrupted and (after any exchange in progress has completed), the Pass_Key_Code message are sent, and then polling can resume.

6.7.3 Medium Priority: Download_Information Messages

The console 200 is capable of downloading larger blocks of data to speakers using the Download_Information message (see message definitions). This may be used for updating speaker application code, etc. The priority for these messages is lower than queries, but higher than polls. As with Pass_Key_Code messages, the polling cycle is interrupted temporarily to send any pending Download_Information message.

6.7.4 Lowest Priority: Polls

Speaker polls are assigned the lowest priority, and should represent a continuous cycle of messages sent while the console 200 has no more important information to transmit. Sending these polls guarantees each speaker a regular opportunity to send messages upstream to the console 200.

6.8 Only One Speaker is Polled During a Query Exchange

A full Query exchange between the console 200 and a speaker takes place as follows:

1. When a query needs to be sent, the console 200 interrupts the normal polling cycle (after any exchange in progress completes) and immediately sends the desired query to the appropriate speaker.
2. The speaker sends its reply within 767 uSec, if possible. If not, it replies with a POLL_RESPONSE message within 767 uSec.
3. The console 200 withholds polling all other speakers, and instead polls this speaker only, every 6 mSec. The speaker replies with POLL_RESPONSE messages until its query reply is ready. Once ready, it replies with the desired query response.
4. After receiving the desired query response, the console 200 resumes the normal polling cycle for all speakers. Alternately, if a speaker fails to reply at all, or replies as OFF, normal polling can also resume, at the discretion of higher-level software.

6.8 Full List of Commands Used Outside the Main Room

A speaker in the "Main Room" uses the message definitions described below. Speakers outside the Main Room may use only limited control messages: volume up/down, mute/unmute, and on/off, for example. All other specific controls for these speakers may be handled by passing remote control commands transparently through the console to the speaker (using the Pass_Key_Code command), where they will be interpreted properly.

The following is a list of commands able to be received by non main-room speakers. See message definitions, below, for details of constructing the messages:

6.8.1 POLL and POLL REPLY Messages (Headers 0x00/0x80)

Polls are the lowest-priority message, sent continuously by the console 200 to all speakers as determined by the polling cycle. Used by the console 200 to continuously monitor the ON/OFF, Local/Network and volume/mute status of all speakers, as well as to provide frequent opportunities for speakers to send messages to the console 200. Interrupted whenever a higher-priority message needs to be sent. Speakers typically reply with a Poll Reply, but substitute higher-priority replies if any are pending.

6.8.2 ON/OFF Message (Header 0x01)

This message may be used by the console 200 to turn speakers ON or OFF. Speakers may also turn on after receiving a number of different passed-through RF remote buttons, or after receiving a command from a local IR remote. In these cases, polling is used to detect its power-on.

6.8.3 PASS_KEY_CODE Message (Headers 0x0D/0x8D)

This message may be used by the console 200 (using Header 0x0D) to pass speaker-specific RF remote control commands through. The console 200 may not interpret these commands at all. Using Header 0x8D, speakers will be capable of sending button presses back upstream to the console 200.

6.8.4 SET_MAIN_ATTENUATION Message (Header 0x02)

The console 200 may use the Mute and Return_to_Last_Volume arguments, as broadcasts, in response to Mute All events.

6.8.5 QUERY_SPEAKER_INFO Message (Header 0x0B)

This message is used by the console 200 to determine the variety of speaker attached. The console 200 may also use the Query_Main_Attenuation and Query_Download_Info_Status arguments.

6.8.6 DOWNLOAD_INFORMATION Message (Headers 0x0A/0x8A)

This message (Header 0x0A) may be used to push console 200 status information onto a speaker or may be used for sending other data blocks to a speaker (possibly application code updates, etc.). Using Header 0x8A, speakers can use this message type to upload blocks of data to the console (source-related data to be displayed, for example).

7.0 The Polling Cycle

7.1 Overview

The standard replies to polls may provide basic speaker status information regarding its on/off state, local/network listening mode, its mute state and its volume level. Speakers have the ability to substitute higher-priority messages (if pending) for its standard poll reply, providing opportunities to transfer important button presses and blocks of data back upstream to the console 200.

Speakers connected to the network may be off for long periods of time. When off, speakers only need to be polled occasionally to detect when a keystroke has turned them on. However, speakers which are both connected and turned on should be polled rapidly to guarantee good response time for messages sent upstream to the console 200. A Polling Cycle is therefore described which meets these needs, and whose performance is controlled to degrade predictably but gracefully as the number of ON speakers increases.

7.2 Polling Cycle Timing Details

The polling process organizes all 15 possible speakers into two lists: presently ON speakers, and NOT ON speakers (off or disconnected). The console first polls all members of the presently ON speakers list (up to 15, in sequence), then polls a single member of the NOT ON list (if any). This represents one subcycle of the Polling Cycle. Then the subcycle repeats (with no interruption), using the same list of ON speakers but the next member of the NOT ON list (in a circular, round-robin fashion).

For example, if only speaker A is ON, the total Polling Cycle would be:

AB, AC, AD, AE, AF, AG, AH, AI, AJ, AK, AL, AM, AN, AO, then this would repeat, without interruption. 14 total subclass.

One subcycle ~11 mSec. Total cycle ~153 mSec.

If only speakers C and G are known to be ON, the Polling Cycle would be:

CGA, CGB, CGD, CGE, CGF, CGH, CGI, CGJ, CGK, CGL, CGM, CGN, CGO, then this would repeat. 13 subcycles.

One subcycle ~16 mSec. Total cycle ~214 mSec.

If all speakers were ON, the Polling Cycle would be:

ABCDEFGHIJKLMNO, then this would repeat. 15 subcycles.

One subcycle=total cycle ~82 mSec. This results in the longest latency for messages from speakers to the console.

If all speakers were NOT ON, the Polling Cycle would be the same as for all ON. 15 subcycles.

Longest total cycle would be any 7 speakers ON, the rest NOT ON.

One subcycle ~44 mSec. Total cycle ~351 mSec. This has the longest latency identifying speakers turning ON.

When each SUBCYCLE of the Polling Cycle is completed, the list of ON and NOT ON speakers should be updated based on poll responses. Any previously NOT ON speaker which replied as ON in the last subcycle should be moved immediately to the ON list. All previously ON speakers which replied as OFF or have failed to reply all together for 5 subcycles should be moved to the NOT ON list. When polling first begins after console reset, all speakers begin in the NOT ON list.

| Number of ON Speakers | Poll Period for a Given ON Speaker (One Subcycle) | Poll Period for ALL Speakers (Total Polling Cycle) |
|---|---|---|
| 0 | n.a. | 82 mSec |
| 1 | 11 mSec | 153 mSec |
| 2 | 16 mSec | 214 mSec |
| 3 | 22 mSec | 263 mSec |
| 4 | 27 mSec | 301 mSec |
| 5 | 33 mSec | 329 mSec |
| 6 | 38 mSec | 345 mSec |
| 7 | 44 mSec | 351 mSec |
| 8 | 49 mSec | 345 mSec |
| 9 | 55 mSec | 329 mSec |
| 10 | 60 mSec | 301 mSec |
| 11 | 66 mSec | 263 mSec |
| 12 | 71 mSec | 214 mSec |
| 13 | 77 mSec | 153 mSec |
| 14 | 82 mSec | 82 mSec |
| 15 | 82 mSec | 82 mSec |

7.3 Typical Poll and Reply Message Bytes

Unless the console or speaker has higher-priority messages to send, the system will default to a polling cycle using messages formatted as follows:

Console Poll (3 bytes):
First (Header) byte: 0x00 (POLL message).
Second (Address) byte: as per the present Normal protocol.
Third (Verifier) byte: as per the present Normal protocol.
Speaker Poll Reply (4 bytes):
First (Header) Byte: 0x80 (POLL REPLY).
Second (Address) byte: Speaker address byte, including on/off/local/network status.
Third (Argument) byte: Becomes volume/mute status, as follows:
Argument Details:
Bits 6 . . . 0: Speaker's Main Attenuation level, per the present Normal protocol.
Bit 7: Mute state: 1=muted. 0=not muted.
Fourth (Verifier) byte: as per the present Normal protocol.

7.4 Using the PASS_KEY_CODE Message as a Reply (Header 0x8D)

As is true following any console message, this (4-byte) message is, if available to be sent, returned instead of the SPEAKER_INFO reply (0x8C), following a console POLL message. The Argument byte will contain the key code identifier associated with one of 256 possible buttons meant to control the console. NOTE: existing key codes for IR/RF remotes should be used, if possible.

7.5 Using the DOWNLOAD_INFORMATION Message (0x8A) as a Reply

This (N-byte) reply is, if available to be sent, returned instead of the SPEAKER_INFO reply (0x8C) following any console message, including polls. The Argument/Data bytes could contain any sort of data, high-level commands or queries (all presently undefined) intended for the console. This may be used for sending local source-related data to the console for display on a remote control. It would conceptually also allow a speaker to directly command source changes, etc., or to request zone/source-specific status information for a local display (tuner station being played, etc.).

8.0 High-Level Speaker Control Issues

8.1 Master/Slave Configuration

There is only one Master on a given bus. The bus Master may initiate a transmission at any time, as long as the bus is Idle (it allows all messages and replies currently in progress to complete before initiating transmissions), and as long as it respects the message timing details described later.

Speakers only transmit following a message sent to them by the console. However, as described later, any console message may be used as an opportunity for speakers to initiate transmissions.

8.2 Room Addressing is Unique

New speakers added to the network have a unique 4-bit Room Address (RoomA through RoomO, matching the remote control intended to operate the speaker) properly set before connecting to the network.

8.3 Managing Separate Physical Buses for Zone1 and Zone2

The console 200 has two separate physical smart speaker buses (one for each Speaker Output connector). Both Zone1 and Zone2 audio streams are available on the Zone2 Speaker Output connector, as is the Zone2 Speaker Data signal. RoomB through RoomO speakers may be plugged into the Zone2 Speaker Output connector, and controlled using the Zone2 Speaker Data signal.

8.4 Speaker Control Modes

Smart Speaker messages are defined which allow two different modes of controlling the speaker: Master Mode and Pass-Through Mode. Master Mode commands allow a controlling unit (e.g., the console) to keep track of all critical speaker parameters, and to send these as absolute values (arguments) to the speaker at the appropriate time. Pass-Through Mode allows a less intelligent controlling unit (as simple as an IR/Smart Speaker protocol bridge) to effectively pass remote control messages directly to the speaker. In this mode, the speaker keeps track of critical parameters (its last volume level before being muted, etc.).

Consoles wishing to control networked speakers via Master Mode maintain a table describing the available features of each type of speaker to be controlled (types and ranges of controls, etc.).

8.5 Detecting New Speakers

After powering-up (hardware reset), networked speakers are responsible for entering the OFF STATE (muted, with hardware in its lowest-current state. In this state, only the hardware responsible for interfacing with the network is operational. The speaker is able to receive and reply to (at a minimum) Poll Messages, Query_Speaker_Info Messages, as well as ON/OFF Messages.

Since the console continuously polls all possible speaker Room Addresses, a speaker newly-added to the Smart Speaker bus can be detected as soon as it begins replying to polls. Once a new speaker has been detected, the console should send a Query_Speaker_Info message to identify its type.

8.6 Powering-Up Networked Speakers

Before sending a networked speaker any commands other than Poll or Query_Speaker_Info messages, it should first be turned on using an ON/OFF Message. This allows the speaker's hardware to become fully operational. The console 200 should delay appropriately to allow this power-up process to complete. If a table is not available describing the power-up delay for each networked speaker, the console 200 should use a default delay time of 1 second.

8.7 Detecting Speaker Status Changes Through Polling

During the course of polling, bits 7 ... 4 of the Address Byte of the speaker's replies will contain information regarding its on/off status, as well as the source it's playing (Zone1, Zone2 or a local source of its own), as follows:

Z3 ... Z0 (Bits 7 ... 4): 0000-1101b: Playing one of 14 possible Zones (0010b=Zone1, 0011b=Zone2, etc.).
1110b: Playing a local source.
1111b: OFF. Presently playing no local or networked sources.

By monitoring these bits, the console can detect when the following important status changes occur:

8.7.1 Speaker Turn On/Off

Speakers could be turned on and off by means of buttons on the units themselves, or via their IR remote controls, or via remote control commands which are simply passed-through the console without an understanding of their significance. Using the Address Z3 ... Z0 bits, the console 200 can monitor the on/off state of each speaker. This allows the console 200 to power-off when all speakers are off, for example.

8.7.2 Speaker Source Changes

Similarly, speakers can switch between Zone1 and Zone2 (or a local source) without the console 200 anticipating it. By monitoring the same Address bits, the console 200 can detect such source changes and take appropriate action (such as powering up/down the appropriate audio paths).

8.8 Managing Speaker Stream Switching

Speakers may have the ability to select either the Zone1 or Zone2 networked analog outputs from the console. The speaker will make this selection automatically, by reacting to the Zone bits in the Address byte of every console Pass_Key Code message (Header 0x0D) and On/Off message (Header 0x01). These messages are sent to speakers as a direct result of button presses on its RF remote control, and will therefore have their Zone bits set exactly as received in the message from the remote (these bits are passed directly though from the remote to the speaker). On/Off messages are included here because the console sends one in response to all remote control source button presses (AM/FM, AUX, CD/DVD, etc.), where the On/Off message ensures that networked speakers are both ON and unmuted when a source is selected. Pass_Key_Code messages sent to speakers playing Local sources will not switch speakers away from Local mode. A Pass_Key_Code message with an On/OFF button argument passed to speakers allows them to power-up in their last-played source (either Network or Local). If a speaker chooses to play a networked stream/zone in this, case, it selects the stream indicated in the message Address (as opposed to the last-played stream).

9.0 Message Definitions

9.1 Quick Reference Tables

Messages Sent By: CONSOLE/MASTER
Received By: SPEAKERS/SLAVES

| Section | Message | Header Byte | Total Bytes | Queue Priority |
|---|---|---|---|---|
| | POLL MESSAGE | 0x00 | 3 | Low |
| | ON/OFF MESSAGE | 0x01 | 4 | High |
| | SET MAIN ATTENUATION | 0x02 | 4 | High |
| | SET SECONDARY LEVELS | 0x03 | 4 | High |
| | SET EQ TYPE/TONE LEVELS | 0x04 | 4 | High |
| | SET SPEAKER MODE | 0x05 | 4 | High |
| | CONTROL EFFECTS | 0x06 | 4 | High |
| | SELECT INPUT SOURCE | 0x07 | 4 | High |
| | SELECT DECOMPRESSOR | 0x08 | 4 | High |
| | SELECT POST PROCESSOR | 0x09 | 4 | High |
| | DOWNLOAD INFORMATION | 0x0A | 5-255 | Medium |

-continued

| Messages Sent By: CONSOLE/MASTER Received By: SPEAKERS/SLAVES | | | |
|---|---|---|---|
| Section Message | Header Byte | Total Bytes | Queue Priority |
| QUERY SPEAKER INFO | 0x0B | 4 | High |
| unused | 0x0C | | |
| PASS KEY CODE | 0x0D | 4 | Medium |
| unused | 0x0E-10 | | |
| INSTALLER SERVER PUSH | 0x11 | 4 | High |
| INSTALLER SERVER EXEC | 0x12 | 4 | High |
| unused | 0x12-0x7F | | |

| Messages Sent By: SPEAKERS/SLAVES Received By: CONSOLE/MASTER | | | |
|---|---|---|---|
| Section Message | Header Byte | Total Bytes | Queue Priority |
| POLL REPLY | 0x80 | 4 | Low |
| unused | 0x81-89 | | |
| DOWNLOAD INFORMATION | 0x8A | 5-255 | Medium |
| unused | 0x8B | | |
| QUERY SPEAKER INFO REPLY | 0x8C | 4-9 | High |
| PASS KEY CODE | 0x8D | 4 | Medium |
| unused | 0x8E-92 | | |
| QUERY INSTALLER SERVER REPLY | 0x93 | 4 | High |
| unused | 0x94-0xFF | | |

9.2 Messages Sent by the Console

The following messages are an exemplary set of message definitions that may be sent by the console 200.

9.2.1 POLL Message (Header 0x00)

Sender: Console

Total Bytes: 3

Queue Priority: LOW

The Poll Message is the only 3-byte message presently defined. The 4 most-significant bits of its Address byte identify the proper audio Zone for the speaker to play. The 4 least-significant bits identify the speaker being polled (by its Room Number, as set by the speaker DIP switches).

No Argument is required, so it is left out, to preserve network bandwidth.

Poll messages are sent, in effect, as a simple form of query to obtain Poll Response information, and to provide speakers a regular opportunity to pass any other important messages.

| POLL Message | | |
|---|---|---|
| Byt | Name | Description |
| 1 | Header | 0x00 |
| 2 | Address | General description: |
| | | b7..b4: Zone Number(0000-1111b). 15 unique zones allowed. |
| | | 0000b = Zone1 (passed-through from the RF remote control). |
| | | 0001b = Zone2 (passed-through from the RF remote control). |
| | | 0010b-1110b = unused. Reserved for future zones. |
| | | 1111b = All zones. Used for broadcasts, such as Mute All assert. |
| | | b3..b0: Room Number(0000-1111b). 15 unique rooms allowed (referred to as A-O). |
| | | 0000b = Room A |
| | | 0001-1110b = RoomB-RoomO. |
| | | 1111b = ALL ROOMS, and is only used for messages broadcasted to all rooms of the designated zone. |
| — | Argument | No Argument sent for this message. 3 total message bytes only. |
| 3 | Verifier | XOR of bytes 1 and 2. |

9.2.2 ON/OFF Message (Header 0x01)

Sender: Console

Total Bytes: 4

Queue Priority: HIGH

An ON/OFF Message informs the addressed Smart Speaker(s) to fully power-up in preparation for playing audio, or to power down after a session. Note: this command will be used by the console when source buttons are pressed on the remote, to ensure that a speaker is fully powered up, unmuted, and selecting the desired network input stream.

| ON/OFF Message | | |
|---|---|---|
| Byte | Name | Description |
| 1 | Header | 0x01 |
| 2 | Address | Same as for the console POLL Message. |
| 3 | Argument | 0x00 = Begin normal power-up procedure, but remain MUTED. |
| | | 0x01 = Power-up normally and ramp to the last state before OFF (last Master Attenuation level, Secondary Attenuation levels, EQ Type, Speaker Mode, Tone Levels, Effects states, etc.). Select the NETWORK input stream (zone) identified in the Address Byte. NOTE: if already ON but MUTED, this command will UNMUTE. |
| | | 0x02-0x7F = undefined. |
| | | 0x80 = Power-down normally/slowly (ramp volume, soft mute, etc.). |
| | | 0x81 = Power-down immediately (power fail imminent). Immediate mute. |
| | | 0x82-0xA9 = undefined. |
| | | 0xAA = Power up in TAP protocol mode (used by manufacturing). |
| | | 0xAB-0xEF = undefined. |
| | | 0xF0 = Execute software RESET (useful after downloading new code, etc.). |
| | | 0xF1-0xFE = undefined. |

ON/OFF Message

| Byte | Name | Description |
|---|---|---|
| | | 0xFF = Toggle between ON (power-up and ramp to last state) and OFF (power-down normally/slowly). |
| 4 | Verifier | XOR of bytes 1 through 3. |

It is expected that some amount of time may be necessary for the speaker's power supply rails, etc., to settle before being able to unmute (or, possibly, before the speaker is ready to accept another command). After being turned on, the system can address this issue in three ways:
1. The speaker can be queried for readiness by the console (using the QUERY SPEAKER STATUS command, ON/OFF Status argument) before being commanded to configure its speaker mode, attenuation levels, etc.
2. The speaker can simply choose to not reply to subsequent SET SPEAKER MODE, etc., commands until it is ready to unmute.
3. The console can institute a delay (typically about 1 second) between sending the On/OFF message and sending any subsequent messages.

9.2.3 SET MAIN ATTENUATION Message (Header 0x02)

Sender: Console

Total Bytes: 4

Queue Priority: HIGH

A Set Main Attenuation message commands the addressed Smart Speaker(s) to change their master volume setting to the level indicated. NOTE: the argument contains the new level, expressed as dB of attenuation, where 0 dB represents a speaker's maximum volume. A speaker's available dynamic range is passed through the Query Speaker Info (Speaker Type) reply.

SET MAIN ATTENUATION Message

| Byte | Name | Description |
|---|---|---|
| 1 | Header | 0x02 |
| 2 | Address | Same as for the console POLL Message. Mute All Assert and De-assert set all zone/room bits. |
| 3 | Argument | b7 = 1: Ramp to the desired master attenuation level, using the speaker's internal "slow" volume ramp capability, as follows: If the desired volume is >30 dB louder than the speaker's present level, the speaker shall immediately go to a level 30 dB below (more attenuated than) the desired attenuation level. It shall then, under its own control, ramp its master attenuation to the desired level at a rate of 1 dB per 70 mSec, +/−10%. If the desired speaker volume is <30 dB louder than its present level, it shall immediately begin ramping from its present level, at the 70 mSec/dB rate. If the desired volume is quieter than the speaker's present level, the speaker shall immediately begin ramping toward the desired level at the 70 mSec/dB rate. If the desired level is more than 30 dB from the starting level, the speaker shall only ramp for the first 30 dB, and then jump immediately to the desired level. b7 = 0: Go immediately to the new master attenuation level described (no ramp). Speakers, optionally, should include a "fast" ramp here (reaching the desired level in 50 mSec). b6..b0 = Set the desired master attenuation level for the speaker (expressed as dB of attenuation): 0000000b = no attenuation (full volume). Speaker's loudest level. 0000001b = 1 dB attenuation. 0000010b = 2 dB attenuation, etc. 1110111b = 119 dB attenuation. NOTE: attenuation levels greater than those supported by the speaker shall result in the speaker going to MUTE. SPECIAL EXCEPTIONS: 1111000b = MUTE (go to maximum possible attenuation). 1111001b = UNMUTE (return to last volume level before OFF or MUTE. This level is stored by the speaker). |

SET MAIN ATTENUATION Message

| Byte | Name | Description |
|---|---|---|
| | | 1111010b = Toggle between MUTE (1111000b) and UNMUTE (1111001b).<br>1111011b = VOLUME UP 1 dB (reduce attenuation 1 dB) from present level.<br>1111100b = VOLUME DOWN 1 dB (increase attenuation 1 dB) from present level.<br>1111101b = MUTE ALL ASSERT (Mute. Set Mute All Active flag if previously unmuted).<br>1111110b = MUTE ALL DE-ASSERT (Unmute if Mute All Active flag set).<br>1111111b = undefined.<br>Examples:<br>Mute immediately (no ramp): 01111000b.<br>Unmute with ramp to volume level "Max-12" (12 dB attenuation): 10001100b.<br>Ramp to volume level "Max-6" (6 dB of attenuation): 10000110b.<br>Increase volume by 1 dB (decrease attenuation by 1 dB): 01111011b. |
| 4 | Verifier | XOR of bytes 1 through 3. |

9.2.4 SET SECONDARY LEVELS Message (Header 0x03)
Sender: Console
Total Bytes: 4
Queue Priority: HIGH

SET SECONDARY LEVELS Message

| Byte | Name | Description |
|---|---|---|
| 1 | Header | 0x03 |
| 2 | Address | Same as for the console POLL Message. |
| 3 | Argument | b7..b5 select one of 8 secondary levels to adjust:<br>000 = Center Level.<br>001 = undefined.<br>010 = Surround Level.<br>011-111 = undefined.<br>b4..b0 select the desired absolute level:<br>00000-01110b = steps below/left/front of default (down to −15 steps).<br>10000b = "speaker default."<br>10001-11110b = steps above/right/rear of default (up to +14 steps).<br>NOTE: a "step" size may or may not correspond to a change of 1 dB--to be determined by the speaker being controlled.<br>SPECIAL EXCEPTIONS:<br>01111b = INCREMENT 1 STEP FROM PRESENT LEVEL.<br>11111b = DECREMENT 1 STEP FROM PRESENT LEVEL.<br>Examples:<br>Set Center level 3 steps above default: 00010011b.<br>Set Surround level 6 steps below default: 01001010b.<br>Decrement Surround level 1 step from present level: 01011111b. |
| 4 | Verifier | XOR of bytes 1 through 3. |

9.2.5 SET EQ TYPE/TONE LEVELS Message (Header 0x04)
Sender: Console
Total Bytes: 4
Queue Priority: HIGH

SET EQ TYPE/TONE LEVELS Message

| Byte | Name | Description |
|---|---|---|
| 1 | Header | 0x04 |
| 2 | Address | Same as for the console POLL Message. |
| 3 | Argument | b7..b5 selects an overall EQ type, OR select one of 7 Tone Levels to adjust, as follows:<br>000b = Set Overall EQ Type (types defined in b4..b0, see below).<br>001b = Set Treble Level.<br>010b = Set Bass Level.<br>011b-111b = undefined.<br>When setting overall EQ type (b7..b5 = 000b), b4..b0 define the type as follows: |

SET EQ TYPE/TONE LEVELS Message

| Byte | Name | Description |
|---|---|---|
|  |  | 00000b = NEXT EQ TYPE (scroll to next type in sequence). |
|  |  | 00001b = Audio (Normal) EQ Mode. |
|  |  | 00010b = Film EQ Mode. |
|  |  | 00011b = Audio (Normal) EQ Mode, but add 1-sample delay to right channel. |
|  |  | 00100b = Film EQ Mode, but add 1-sample delay to right channel. |
|  |  | 00100-11111b = undefined. |
|  |  | Otherwise, when adjusting a tone level, b4..b0 select the desired level, as follows: |
|  |  | 00000-01110b = steps (usually dB) below speaker's default (down to −15 steps). |
|  |  | 10000b = "speaker default." |
|  |  | 10001-11110b = steps (usually dB) above speaker's default (up to +14 steps). |
|  |  | SPECIAL EXCEPTIONS: |
|  |  | 01111b = INCREMENT 1 STEP (USUALLY 1 dB) FROM PRESENT LEVEL. |
|  |  | 11111b = DECREMENT 1 STEP (USUALLY 1 dB) FROM PRESENT LEVEL. |
|  |  | Examples: |
|  |  | Select Next EQ Type (in Sequence): 00000000b. |
|  |  | Select Audio (Normal) EQ Type: 00000001b. |
|  |  | Select Film EQ Type: 00000010b. |
|  |  | Set Bass level 3 dB above default: 01010011b. |
|  |  | Set Treble level 6 dB below default: 00101010b. |
|  |  | Decrement treble 1 dB from present level: 00111111b. |
| 4 | Verifier | XOR of bytes 1 through 3. |

9.2.6 SET SPEAKER MODE Message (Header 0x05)
Sender: Console
Total Bytes: 4
Queue Priority: HIGH

SET SPEAKER MODE Message

| Byte | Name | Description |
|---|---|---|
| 1 | Header | 0x05 |
| 2 | Address | Same as for the console POLL Message. |
| 3 | Argument | Speaker mode desired, as follows: |
|  |  | 0x00 = NEXT SPEAKER MODE (scroll to speaker's next possible speaker mode, in sequence). |
|  |  | 0x01 = "BEST" SPEAKER MODE (speaker-defined mode best suited to this source). |
|  |  | 0x02 = stereo (left and right only). |
|  |  | 0x03 = stereo + center. |
|  |  | 0x04 = undefined. |
|  |  | 0x05 = stereo + center + left and right surrounds (for video sources). |
|  |  | 0x06-0xFF = undefined. |
| 4 | Verifier | XOR of bytes 1 through 3. |

9.2.7 CONTROL EFFECTS Message (Header 0x06)
Sender: Console
Total Bytes: 4
Queue Priority: HIGH

SELECT EFFECTS Message

| Byte | Name | Description |
|---|---|---|
| 1 | Header | 0x06 |
| 2 | Address | Same as for the console POLL Message. |
| 3 | Argument | b7..b4 select 1 of 16 effects to control, as follows: |
|  |  | 0000b = Control Effect 1. |
|  |  | 0001b = Control Effect 2. |
|  |  | 0010 = Control Effect 3. |
|  |  | 0011-1111b = undefined. |
|  |  | When controlling an effect, b3..b0 select the desired state, as follows: |
|  |  | 0000b = Disable the effect. |
|  |  | 0001b = Enable the effect. |
|  |  | 0010b = Toggle the effect. |
|  |  | 0011-1111b = undefined. |
|  |  | SPECIAL CONTROLS: |
|  |  | 0011b = undefined. |
|  |  | 0100b = undefined. |
|  |  | 0101b = undefined. |
|  |  | Examples: |
|  |  | Enable Effect 1: 00000001b. |
|  |  | Disable Effect 2: 00010000b. |
|  |  | Toggle Effect 3 On/Off: 00100010b. |
| 4 | Verifier | XOR of bytes 1 through 3. |

9.2.8 SELECT AUDIO INPUT Message (Header 0x07)
Sender: Console

Total Bytes: 4

Queue Priority: HIGH

SELECT AUDIO INPUT Message

| Byte | Name | Description |
|---|---|---|
| 1 | Header | 0x07 |
| 2 | Address | Same as for the console POLL Message. |
| 3 | Argument | The Argument field selects one of the speaker's inputs to play (NOTE: All input types defined here may not apply every speaker), as follows:<br>0x00 = NEXT INPUT (select next available speaker input, in sequence).<br>0x01 = Select speaker's primary (Console) analog L/R input.<br>0x02-0x0F = Select speaker's auxiliary analog inputs.<br>0x10 = Select speaker's primary (Console) S/PDIF input.<br>0x11-0x1F = Select speaker's auxiliary S/PDIF inputs.<br>0x20 = Select speaker's first local source.<br>0x21-0x2F = Select speaker's other local inputs.<br>0x30-0xFF = undefined. |
| 4 | Verifier | XOR of bytes 1 through 3. |

9.2.9 SELECT DECOMPRESSOR Message (Header 0x08)

Sender: Console

Total Bytes: 4

Queue Priority: HIGH

SELECT DECOMPRESSOR Message

| Byte | Name | Description |
|---|---|---|
| 1 | Header | 0x08 |
| 2 | Address | Same as for the console POLL Message. |
| 3 | Argument | 0x00 = none (PCM)<br>0x01 = AC-3<br>0x02 = MPEG-2<br>0x03 = AAC<br>0x04 = DTS<br>0x05 = MP-3<br>0x06 = unknown (to be identified by the speaker, if possible).<br>0x07 = AC-3, Dolby 1 + 1 Mode (ACMOD = 0), play Left Channel Only.<br>0x08 = AC-3, Dolby 1 + 1 Mode (ACMOD = 0), play Right Channel Only.<br>0x09 = AC-3, Dolby 1 + 1 Mode (ACMOD = 0), play both Left and Right.<br>0x0A = AC-3, Dolby 1 + 1 Mode (ACMOD = 0), play Left + Right.<br>0x0B-0xFF = undefined. |
| 4 | Verifier | XOR of bytes 1 through 3. |

9.2.10 SELECT POST PROCESSING Message (Header 0x09)

Sender: Console

Total Bytes: 4

Queue Priority: HIGH

SELECT POST PROCESSING Message

| Byte | Name | Description |
|---|---|---|
| 1 | Header | 0x09 |
| 2 | Address | Same as for the console POLL Message. |
| 3 | Argument | 0x00 = SELECT NEXT POST PROCESSING ALGORITHM (in sequence).<br>0x01 = Select NO post processing (play audio as 2-channels).<br>0x02 = Select Videostage to matrix-decode multiple channels.<br>0x03 = Select Dolby Digital to matrix decode multiple channels.<br>0x04 = Select "Audiostage," to matrix-decode multiple channels.<br>0x05-0xFF = undefined. |
| 4 | Verifier | XOR of bytes 1 through 3. |

9.2.11 DOWNLOAD INFORMATION Message (Header 0x0A)

Sender: Console

Total Bytes: 5-255

Queue Priority: MEDIUM

The DOWNLOAD_INFORMATION message has a format that allows up to 250 bytes of data to be sent to a speaker via the Smart Speaker packet itself, where the payload can be defined as desired (including local checksum, etc.). Variants of this message type could be defined to write directly to speaker VFD's, or to announce changes to console status (new source being played, new track/station, etc.).

DOWNLOAD INFORMATION Message

| Byte | Name | Description |
|---|---|---|
| 1 | Header | 0x0A |
| 2 | Address | Same as for the console POLL Message. |
| 3 | Argument | 0x00 = Download Console Type (Data fields TBD)<br>0x01 = Download Console Software Version (Data fields TBD)<br>0x02 = Download Console Serial Number (Data fields TBD)<br>0x03-0x0F = undefined.<br>0x10 = Download Source Change Data Block (Input Source, Speaker Mode, Effects, |

DOWNLOAD INFORMATION Message

| Byte | Name | Description |
|---|---|---|
| | | Decompressor, and Post Processing bytes follow as Data fields. Length is 10 bytes.) |
| | | 0x11-0x1F = undefined. |
| | | 0x20 = Download New Speaker EQ (data contained in this message). |
| | | 0x21 = Download New Speaker EQ (data contained in S/PDIF stream). |
| | | 0x22-0x2F = undefined. |
| | | 0x30 = Download New Application Code (data contained in this message). |
| | | 0x31 = Download New Application Code (data contained in S/PDIF stream). |
| | | 0x32-0xFE = undefined. |
| | | 0xFF = Abort Download. |
| 4 | Length | Length of the complete message, in bytes, including the Header, Argument and Checksum fields. |
| | | 0x00-0x04 = illegal. |
| | | 0x05-0xFF = length of entire message, in bytes. |
| 5-254 | Data | 8-bit data bytes. |
| Last | Verifier | XOR all previous message fields, including Header. |

9.2.12 QUERY SPEAKER INFO Message (Header 0x0B)

Sender: Console

Total Bytes: 4

Queue Priority: HIGH

QUERY SPEAKER INFO Message

| Byte | Name | Description |
|---|---|---|
| 1 | Header | 0x0B |
| 2 | Address | Same as for the console POLL Message. |
| 3 | Argument | 0x00 = Query speaker ON/OFF status (Used for polling networked speakers). |
| | | 0x01 = Query speaker MAIN ATTENUATION status. |
| | | 0x02 = Query speaker SECONDARY LEVELS status. |
| | | 0x03 = Query speaker TONE LEVELS status. |
| | | 0x04 = Query speaker SPEAKER MODE status. |
| | | 0x05 = Query speaker AUDIO INPUT status. |
| | | 0x06 = Query speaker DECOMPRESSOR status. |
| | | 0x07 = Query speaker POST PROCESSING status. |
| | | 0x08 = Query speaker DOWNLOAD INFO status. |
| | | 0x09 = Query speaker RUNTIME INSTALLER status |
| | | 0x0A-0x0F = undefined. |
| | | 0x10 = Query speaker Type. |
| | | 0x11 = Query speaker Software Variant (used for variations within product families). |
| | | 0x12 = Query speaker Software Revision. |
| | | 0x13 = Query speaker Serial Number. |
| | | 0x14-0xEF = undefined. |
| | | 0xFX = Query speaker EFFECT status, where X is a 4-bit value identifying the effect (1 out of 16 possible) whose status is requested. |
| | | 0xF0 = Effect 1 status. |
| | | 0xF1 = Effect 2 status. |
| | | 0xF2 = Effect 3 status. |
| | | 0xF3-0xFF = undefined. |
| 4 | Verifier | XOR of bytes 1 through 3. |

9.2.13 PASS KEY CODE Message (Header 0x0D)

Sender: Console

Total Bytes: 4

Queue Priority: MEDIUM

The Pass Key Code message, in this case, is used by the console to pass-through RF remote control button presses to the speakers. The Argument byte should contain the key code byte, exactly as received from the RF remote control.

PASS KEY CODE Message

| Byte | Name | Description |
|---|---|---|
| 1 | Header | 0x0D |
| 2 | Address | Same as for the console POLL Message. |
| 3 | Argument | b7..b0: 8-bit remote control key code. |
| 4 | Verifier | XOR of bytes 1 and 2. |

9.3 Messages Sent by Speakers

The following are exemplary messages are allowed to be sent by speakers (network slaves).

9.3.1 POLL REPLY Message (Header 0x80)

Sender: Speakers

Total Bytes: 4

Queue Priority: LOW

POLL REPLY Message

| Byte | Name | Description |
|---|---|---|
| 1 | Header | 0x80 |
| 2 | Address | NOTE: The address byte for speaker messages is different than for console messages: |
| | | b3..b0: Same as defined for speaker messages: indicates one of 15 possible rooms, but with 1111b undefined for speakers (since speakers do NOT reply to broadcasts). |
| | | b7..b4: |
| | | 0000-1101b: Playing one of 14 possible Zones (0010b = Zone1, 0011b = Zone2, etc.). |
| | | 1110b: Playing a local source. |
| | | 1111b: OFF. Presently playing no local or networked sources. |
| 3 | Argument | b7: Mute state: 1 = muted. 0 = not muted. |
| | | b6..0: Speaker's Main Attenuation level, in dB. |
| | | 0000000b = 0dB attenuation (full volume). |
| | | 0000001b = 1dB attenuation, etc. |
| 4 | Verifier | XOR of bytes 1 and 2. |

9.3.2 DOWNLOAD INFORMATION Message (Header 0x8A)

Sender: Speakers

Total Bytes: 5-255

Queue Priority: MEDIUM

| | | DOWNLOAD INFORMATION Message |
|---|---|---|
| Byte | Name | Description |
| 1 | Header | 0x8A |
| 2 | Address | Same as for speaker POLL REPLY Message (Different than console messages). |
| 3 | Argument | 0x00 = Download Console Type (Data fields TBD) |
| | | 0x01 = Download Console Software Version (Data fields TBD) |
| | | 0x02 = Download Console Serial Number (Data fields TBD) |
| | | 0x03-0x0F = undefined. |
| | | 0x10 = Download Source Change Data Block (Input Source, Speaker Mode, Effects, Decompressor, and Post Processing bytes follow as Data fields. Length is 10 bytes.) |
| | | 0x11-0x1F = undefined. |
| | | 0x20 = Download New Speaker EQ (data contained in this message). |
| | | 0x21 = Download New Speaker EQ (data contained in S/PDIF stream). |
| | | 0x22-0x2F = undefined. |

-continued

| | | DOWNLOAD INFORMATION Message |
|---|---|---|
| Byte | Name | Description |
| | | 0x30 = Download New Application Code (data contained in this message). |
| | | 0x31 = Download New Application Code (data contained in S/PDIF stream). |
| | | 0x32-0xFE = undefined. |
| | | 0xFF = Abort Download. |
| 4 | Length | Length of the complete message, in bytes, including the Header, Argument and Checksum fields. |
| | | 0x00-0x04 = illegal. |
| | | 0x05-0xFF = length of entire message, in bytes. |
| 5-254 | Data | 8-bit data bytes. |
| Last | Verifier | XOR all previous message fields, including Header. |

9.3.3 QUERY SPEAKER INFO REPLY Message (Header 0x8C)

Sender: Speaker

Total Bytes: 4

Queue Priority: HIGH

| | | QUERY SPEAKER INFO REPLY Message | |
|---|---|---|---|
| Byte | Name | Description | |
| 1 | Header | 0x8C | |
| 2 | Address | Same as for speaker POLL REPLY Message (Different than console messages). | |
| 3 | Argument | Query Argumen | Reply Argument(s) |
| | | 0x00 | Argument: 0x00 = speaker in ON, and able to accept commands. 0x0F = speaker is ON, but unable to accept commands (busy). 0xF0 = OFF, powered-down normally. 0xF1 = OFF, told to power-down fast. |
| | | 0x01 | Argument: 0x00-0x77 (attenuation level) or 0x78 (muted) if speaker is ON, 0xFF if speaker is OFF. |
| | | 0x02 | Argument 1 = Center level: 0x00-0x0E = 1 dB increments below default (down to −15 dB). 0x10 = "speaker default." NOTE: default changes with speaker mode. 0x11-0x1E = 1 dB increments above default (up to +14 dB). Argument 2 = Surround level: 0x00-0x0E = 1 dB increments below default (down to −15 dB). 0x10 = "speaker default." NOTE: default changes with speaker mode. 0x11-0x1E = 1 dB increments above default (up to +14 dB). |
| | | 0x03 | Argument 1 = Overall EQ type: 0x01 = Audio (Normal) EQ Mode. 0x02 = Film EQ Mode. Argument 2 = Treble level: 0x00-0x0E = 1 dB increments below default (down to −15 dB). 0x10 = "speaker default." NOTE: default changes with EQ type selected. 0x11-0x1E = 1 dB increments above default (up to +14 dB). |

QUERY SPEAKER INFO REPLY Message

| Byte | Name | Description |
|---|---|---|
| | | Argument 3 = Bass level: |
| | | 0x00-0x0E = 1 dB increments below default (down to −15 dB). |
| | | 0x10 = "speaker default." NOTE: default changes with EQ type selected. |
| | | 0x11-0x1E = 1 dB increments above default (up to +14 dB). |
| | 0x04 | Argument = Number of speakers active (see Set Speaker Mode message). |
| | 0x05 | Argument = explicit input/substream being played (see Set Input message). |
| | 0x06 | Argument = Decompressor presently active (see Select Decompressor msg). |
| | 0x07 | Argument = Post Processing algorithm active (see Select Post Processing). |
| | 0x08 | Arguments 1-3 = 0x000000-0xFFFFEF: |
| | | 3-byte word describing the count of valid bytes received by the speaker |
| | | via S/PDIF data download. The allowable range for this count is |
| | | 0x000000-0xFFFFEF (up to 16,777,199 bytes), as follows: |
| | | Argument 1 = valid bytes received count, bits 0..7. |
| | | Argument 2 = valid bytes received count, bits 8..15. |
| | | Argument 3 = valid bytes received count, bits 16..23. |
| | | Argument 4 = received checksum. |
| | | Arguments 1-3 >= 0xFFFFE0: |
| | | When arguments 1-3 form a 3-byte word of value greater than |
| | | 0xFFFFEF, they convey download status information, as follows: |
| | | Arguments 1-3 = 0xFFFEF0-0xFFFFFB: undefined. |
| | | Arguments 1-3 = 0xFFFFFC: Speaker indicates an Error. |
| | | Arguments 1-3 = 0xFFFFFD: Speaker is Writing Data. |
| | | Arguments 1-3 = 0xFFFFFE: Speaker is Reading-In Data. |
| | | Arguments 1-3 = 0xFFFFFF: Speaker is waiting for Header. |
| | | Argument 4, in all these cases: 0x00. |
| | 0x09 | Argument |
| | | b0: TRUE if system is installed, i.e. the installer process was run and a valid set of filter coefficients are stored in FLASH. |
| | | b1: TRUE if installer is currently active. |
| | | b2: TRUE if system supports installer server (executing the installer process). |
| | 0x0A-0x0F | Undefined. |
| | 0x10 | Argument 1 = generic Speaker Type ID: |
| | | 0x00 = speaker 1. |
| | | 0x01 = speaker 2. |
| | | 0x02 = speaker 3. |
| | | 0x03 = speaker 4. |
| | | 0x04 = speaker 5. |
| | | 0x05 = undefined. |
| | | 0x06-0xFF = undefined. |
| | 0x11 | Arguments 1-6 = ASCII characters describing the speaker's software variant (family subtype). |
| | 0x12 | Arguments 1-6 = ASCII characters describing the speaker's software revision, formatted as XXYYYa, respectively. XX = major rev digits (zero-padded), YY = minor rev (zero-padded), and a = a letter or blank. |
| | 0x13 | Arguments 1-6 = ASCII characters describing the speaker's manufacturing serial number, if any. |
| | 0x14-0xEF | Undefined. |
| | 0xFX, where X selects 1 of the 16 possible effects. | Argument |
| | | b0-b3 = Status of the effect chosen. |
| | | 0000b = The effect chosen is not supported in this speaker. |
| | | 0001b = The effect chosen is supported, but not installed. |
| | | 0010b = The effect chosen is installed, and presently disabled. |

QUERY SPEAKER INFO REPLY Message

| Byte | Name | Description |
|---|---|---|
| | | 0011b = The effect chosen is installed, and presently enabled. |
| | | 0100-1111b = undefined. |
| | | b4-b7 = 4-bit value identifying the desired effect (1 out of 16). Same as the value of X in the query argument. |
| 4 | Verifier | XOR of all previous bytes, including Header. |

9.3.4 PASS KEY CODE Message (Header 0x8D)

Sender: Speakers
Total Bytes: 4
Queue Priority: MEDIUM

The Pass Key Code message, in this case, is used by speakers to transmit local speaker button presses upstream to the console. The Argument byte should contain the key code byte, exactly as received from the speaker's local IR remote control.

PASS KEY CODE Message

| Byte | Name | Description |
|---|---|---|
| 1 | Header | 0x8D |
| 2 | Address | Same as for speaker POLL REPLY Message (Different than console messages). |
| 3 | Argument | b7..b0: 8-bit remote control key code. |
| 4 | Verifier | XOR of bytes 1 and 2. |

10.0 Wireless Devices

In an exemplary audio network control system that includes wireless devices, the wireless devices take responsibility for the integrity of messages send through a wireless channel. This applies to messages sent downstream from the console to speakers (the "downlink") as well as messages sent back in return (the "backlink"). Any extra error protection/correction is added by the transceiver to guarantee an agreed-upon level of robustness.

Polls from the console are not sent across the wireless link. Instead, wireless slaves will locally poll the speakers attached to them and transmit replies to a wireless master once every 20 mSec. The wireless master will buffer these replies and locally pass them on to the console in response to appropriate polls. Details are provided below. Default replies (Header 0x80) will also be generated by the wireless master in response to all other (i.e., higher-priority) messages from the console to speakers, in some cases until a query reply is returned via the backlink.

A slave device implements a Smart Speaker interface which appears to the speaker to be "identical-enough" to being connected to the console. This includes polling the speaker in a manner similar to the console, interrupting this polling to immediately pass downstream messages through to the speaker, and assembling all poll reply information and transmitting it to the console via the backlink. The Slave's polling will be simplified somewhat, given the topological advantage that one Wireless Slave will be dedicated to every networked speaker.

10.1 The Slave's Local Polling Cycle

Since polls generated by the console are not sent to Slaves, each Slave autonomously identifies its associated speaker and manages a local polling cycle. Wireless Slaves will only need to poll the single speaker attached to it—no local polling will be required for other speakers. To determine the Room Code of the speaker attached to it, the Wireless Slave shall institute a simpler-version of the polling cycle implemented in the console, as follows:

1. The Wireless Slave will continuously poll all possible speakers until it finds one which replies.
2. Subsequently, the Wireless Slave will poll ONLY that speaker, at a 20 mSec rate.
3. If the speaker stops replying, the wireless master will begin polling all possible speakers again, until a replying speaker is found (could be a new Room Code).

To ensure that one poll response is assembled in time for each 20 mSec backlink time period, the Wireless Slave's local polling period will be time-synchronized by the Slave such that poll exchanges occur immediately before each backlink message is sent (beginning about 6 mSec earlier, allowing time to assemble the reply for inclusion in the backlink message). Speaker high-priority messages (local button presses, etc.) will therefore suffer up to about 20 mSec of latency before having an opportunity to be transmitted (the first time) from a Slave to the wireless master.

10.2 Priority of Console Messages Over Local Polling

As previously outlined, delivering console messages is a higher priority than retrieving polling information from a speaker. Therefore, when a Slave receives a message from the console intended for the speaker attached to it (a PASS_KEY_CODE message, for example), the message should be passed-through to the speaker immediately, regardless of the timing of its local polling cycle.

10.3 Local Retry Rules for the Slave

Each Slave needs to manage two situations where retries might be used:

The case where a message passed-through to a Slave's local speaker fails to be replied-to by the speaker.

The case where a message sent by the Slave (from a speaker) to the console via the backlink fails to be properly received by the wireless master (a PASS_KEY_CODE message from the speaker, for example).

In the first case, the Slave locally manages an immediate retry of the console's message to the speaker. Only one retry will be defined to be necessary. Again, it is acceptable if this retry interferes with a scheduled local poll for the speaker.

The second case presumes some form of feedback from the Wireless master to the Slave immediately following an attempted message transfer via the backlink. Such feedback should be defined to be included during the very next Wireless 20 mSec polling cycle. Effectively, this should take the form of a Request for Retry from the Wireless master to each effected Slave. If a Slave sees this Request for Retry, then on its next opportunity to send information via the backlink it should once again forgo sending polling information to the Wireless master in favor of re-sending the last speaker message. This retry mechanism could continue as long as necessary to get the message through to the Wireless master, and should be governed by the Wireless master. 100 mSec (5 retries) might be a good limit here. Note that speaker polling can continue through the retry situation, allowing speaker polling information to be refreshed (overwritten, NOT buffered) and messages to be buffered in a (small) queue awaiting the next opportunity to transmit via the backlink.

10.6 General Responsibilities of the Wireless Master

The Wireless Master, as described, satisfies the console polling protocol by replying in the proper time with all messages and polling information received from the speakers/Slaves, in effect, "fooling" the console into thinking that it is hardwired to its set of speakers. A few specific duties fall out of this, detailed below.

10.6.1 Buffering Speaker Poll Replies to Use Locally

The Wireless Master sends a Poll_Reply (0x80) Message in response to all console messages, for ALL connected speakers, whenever no message of higher priority is pending from a speaker. To generate these Poll_Replies, it buffers the backlink messages resulting from Slaves' local polling cycles and use this information to format proper replies within the timing constraints.

Since polling information represents an ongoing update of the same state variables, poll status buffers for each speaker will be only one message deep, and will be continually refreshed as more recent data is retrieved from speakers. If the Wireless master receives invalid poll reply data from a given speaker (invalid checksum, etc.), the Wireless master will use the (older) data stored in its buffer to reply to the console. If the Wireless master fails to receive valid poll reply information from a given speaker for 5 Seconds, the Wireless master will empty the poll status buffer associated with that speaker and begin withholding replies when polled by the console. It will be the console's responsibility to remove that speaker from its list of ON speakers, etc.

10.6.2 Substituting Higher-Priority Speaker Messages for Poll Replies

As described in previous sections, speakers reply to console messages with the highest-priority return message pending (where Poll Replies are used as a default). Therefore, to simulate this, the Wireless Master identifies when a message of higher-priority than a Poll_Reply is pending from a given speaker, and substitutes this message for the default Poll_Reply after the next console message for that speaker. If both a medium-priority and a high priority message are pending, the high priority message should be sent first.

Passing these higher-priority messages through to the console should not corrupt the poll status buffers for each speaker. Once the higher-priority message has been passed to the console, the Wireless master should return to replying with Poll_Reply messages.

10.6.3 Responsibilities for Higher-Priority Console Messages

As mentioned, the Wireless Master replies to all console messages. This is true, regardless of the priority of the console message (see message definitions). Replies start within the 767 uSec window described previously. Once replying to the console, the Wireless subsystem assumes responsibility for delivering all medium or higher-priority console messages reliably to the speaker (including managing retries), since the console hereafter believes them to have been received by the speaker and may lose the ability to manage retries at a higher level.

10.6.4 Responsibilities During a Query Exchange

As described in previous sections, when a console sends a query to a specific speaker, it (the console) will stop polling other speakers until the reply is returned. It will, instead, continuously poll the speaker for which the reply is pending.

In this situation, the Wireless Master simply continues to reply to the console's polls until either:
1. The console decides to give up and resume polling other speakers, or
2. The query reply comes through from the desired speaker. The Wireless master shall give this a higher priority than poll replies, and therefore transfer it to the console in response to the next available poll.

10.6.5 Requesting Retries from Slaves

Since the Wireless backlink may be less reliable than the downlink, it is possible that high-priority messages from a Slave may arrive corrupted at the Wireless master. In such situations, the Wireless master may continually request retries from the Slave until the message is transferred intact.

Other embodiments are within the scope of the following claims.

What is claimed is:

1. A method for an audio communication system, comprising:
controlling a plurality of audio devices from a master device over a wired network for one or more wired audio devices and over a wireless network for one or more slave wireless audio devices;
receiving a reply from each of the wired audio devices in response to a poll message from the master device and;
appointing a local wireless master from among the slave wireless devices,
receiving in the master device aggregate polling information indicative of states of the slave wireless audio devices from one of the slave wireless audio devices acting as a local wired master by replying in the proper time with all messages and polling information received from the slave wireless audio devices without waiting for a poll message from the master device;
the local wired master finding all slave wireless audio devices that yield a polling response, buffering all said polling responses, and then on a preset time which coincides with the imminent periodic polling by the master device, as previously determined by and ascertained by the local wired master, releasing the buffered polling responses such that they arrive at the master device immediately after the issuance by the master device of poll requests to all the slave wireless audio devices,
wherein the local wired master performs explicit steps of polling, and assembling all poll reply information and sending the assembled poll reply information to the master device.

2. The method of claim 1 wherein the one of the slave wireless audio devices acting as a master providing aggregate polling information locally polls the wireless audio devices in a predetermined cycle.

3. A method for an audio communication network in accordance with claim 1 including at least one master device and a plurality of slave devices comprising:
transmitting a message consisting essentially of a header field, an address field, an argument field, and a verifier field,
wherein the argument field of the message does not include any byte when the message is polling message and the 4 most significant bits of the address field identifies audio zone for the audio devices to play and the 4 least significant bits of the address field identifies the audio device being polled.

4. A method for an audio communication network in accordance with claim 1 including at least one master device and a plurality of slave devices comprising:

receiving a message consisting essentially of a header field, an address field, an argument field, and a verifier field, wherein the argument field of the message does not include any byte when the message is polling message and the 4 most significant bits of the address field identifies audio zone for the audio devices to play and the 4 least significant bits of the address field identifies the audio device being polled.

5. A method for an audio communication network in accordance with claim 1 including at least one master device and a plurality of slave devices comprising:

assembling a message consisting essentially of a header field, an address field, an argument field, and a verifier field.

wherein the argument field of the message does not include any byte when the message is polling message and the 4 most significant bits of the address field identifies audio zone for the audio devices to play and the 4 least significant bits of the address field identifies the audio device being polled.

6. The method of claim 5, further comprising transmitting the message.

7. A method in accordance with claim 1 for an audio communication network including a non-transitory computer readable medium storing the protocol for the audio communication network including at least one master device and a plurality of slave devices comprising:

a message format consisting essentially of a header field, an address field, an argument field, and a verifier field, wherein the argument field of the message does not include any byte when the message is polling message and the 4 most significant bits of the address field identifies audio zone for the audio devices to play and the 4 least significant bits of the address field identifies the audio device being polled.

* * * * *